United States Patent
Baek et al.

(10) Patent No.: US 9,983,780 B2
(45) Date of Patent: May 29, 2018

(54) MOBILE TERMINAL AND CONTROLLING METHOD THEREOF

(71) Applicant: LG ELECTRONICS INC., Seoul (KR)

(72) Inventors: Songyi Baek, Seoul (KR); Byoungzoo Jeong, Seoul (KR); Samsick Kim, Seoul (KR); Wook Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 292 days.

(21) Appl. No.: 14/701,027

(22) Filed: Apr. 30, 2015

(65) Prior Publication Data

US 2015/0317053 A1 Nov. 5, 2015

(30) Foreign Application Priority Data

May 2, 2014 (KR) .................. 10-2014-0053437

(51) Int. Cl.
| | |
|---|---|
| *G06F 3/0488* | (2013.01) |
| *G06F 3/041* | (2006.01) |
| *G06F 3/0354* | (2013.01) |
| *G06F 3/0481* | (2013.01) |

(52) U.S. Cl.
CPC ........ *G06F 3/0488* (2013.01); *G06F 3/03545* (2013.01); *G06F 3/0416* (2013.01); *G06F 3/04817* (2013.01); *G06F 3/04883* (2013.01); *G06F 2203/04808* (2013.01)

(58) Field of Classification Search
CPC .. G06F 3/0488; G06F 3/03545; G06F 3/0416; G06F 3/04817
See application file for complete search history.

(56) References Cited

U.S. PATENT DOCUMENTS

| | | | | |
|---|---|---|---|---|
| 2010/0283748 A1* | 11/2010 | Hsieh | .................... | G06F 3/0416 345/173 |
| 2012/0056829 A1* | 3/2012 | Kasahara | .............. | G06F 3/0488 345/173 |
| 2012/0319971 A1* | 12/2012 | Eguchi | ................ | G06F 3/04883 345/173 |
| 2013/0300710 A1* | 11/2013 | Cho | ........................ | G06F 3/044 345/174 |
| 2014/0035946 A1* | 2/2014 | Chang | ..................... | G06F 3/017 345/619 |
| 2014/0334732 A1* | 11/2014 | Jung | ................... | G06F 3/04883 382/188 |

OTHER PUBLICATIONS

European Search Report dated Sep. 21, 2015 for Application No. EP 15 00 1302.

* cited by examiner

*Primary Examiner* — Roland J Casillas
(74) *Attorney, Agent, or Firm* — KED & Associates, LLP

(57) ABSTRACT

A mobile terminal and controlling method thereof are disclosed, by which a writing input is facilitated using at least two pointers. The present invention includes a touchscreen configured to receive a touch input, and a controller, if the touch input with a main pointer is received while the touch input with at least one auxiliary pointer is maintained, configured to control a writing object drawn along a touch trace of the main pointer to be displayed on the touchscreen.

9 Claims, 50 Drawing Sheets

(a)          (b)

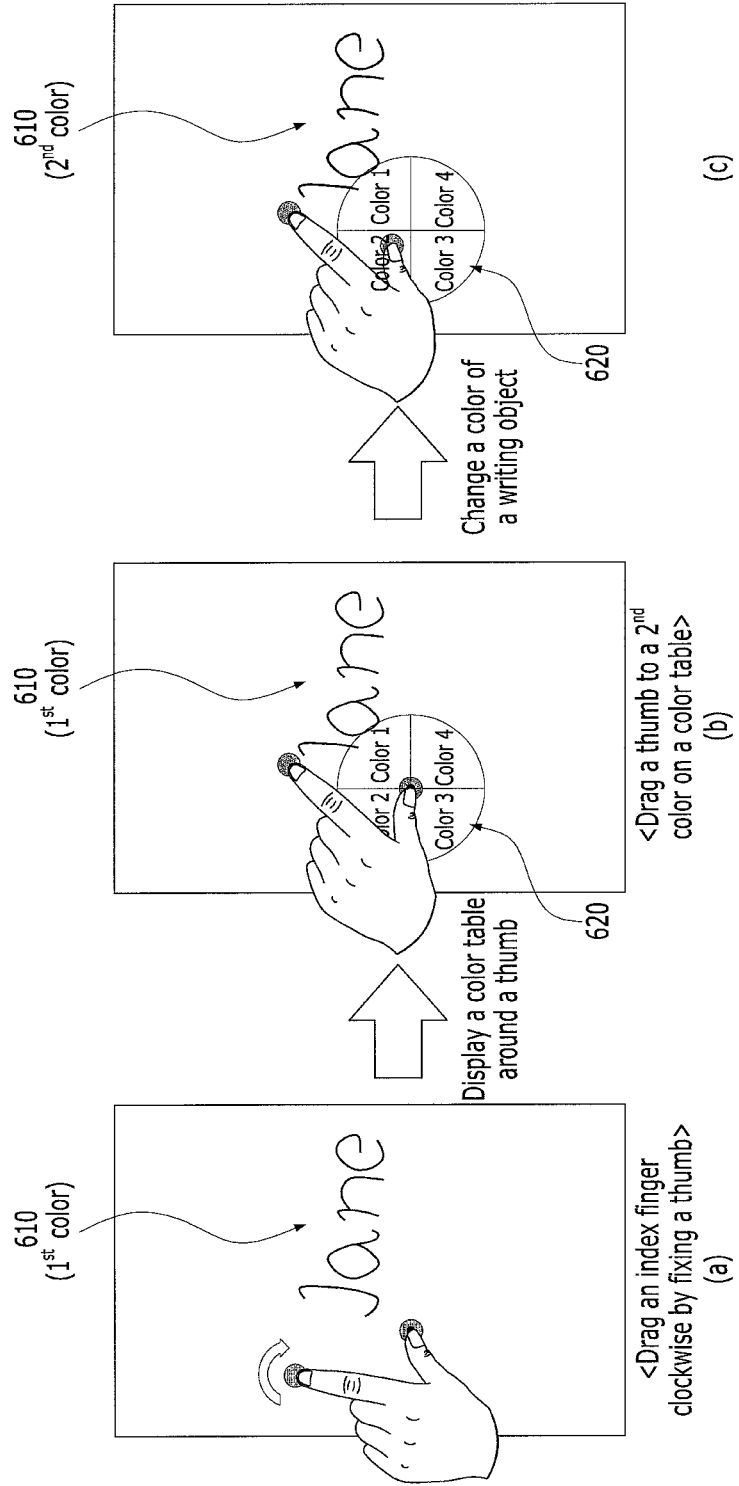

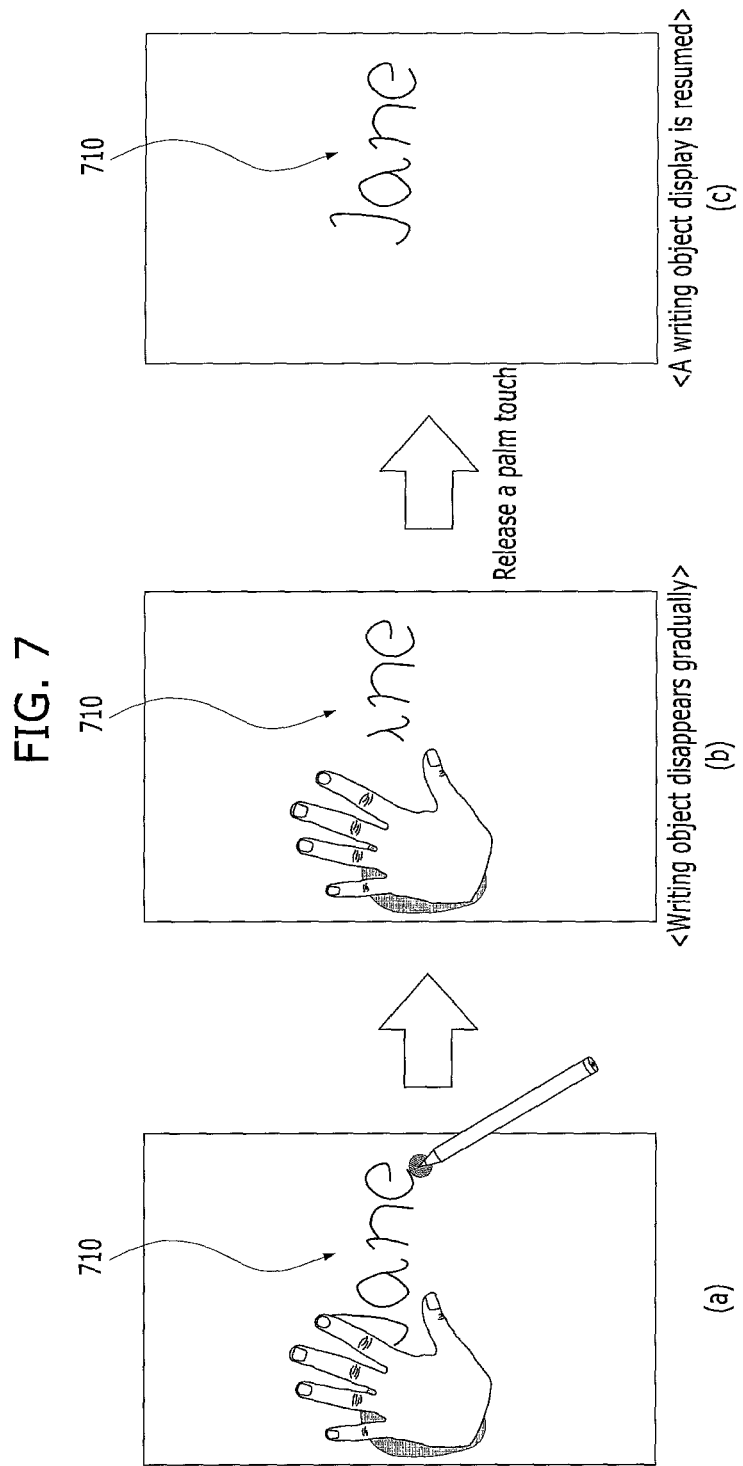

(a)

<Display a text at a touch location of an index finger>
(b)

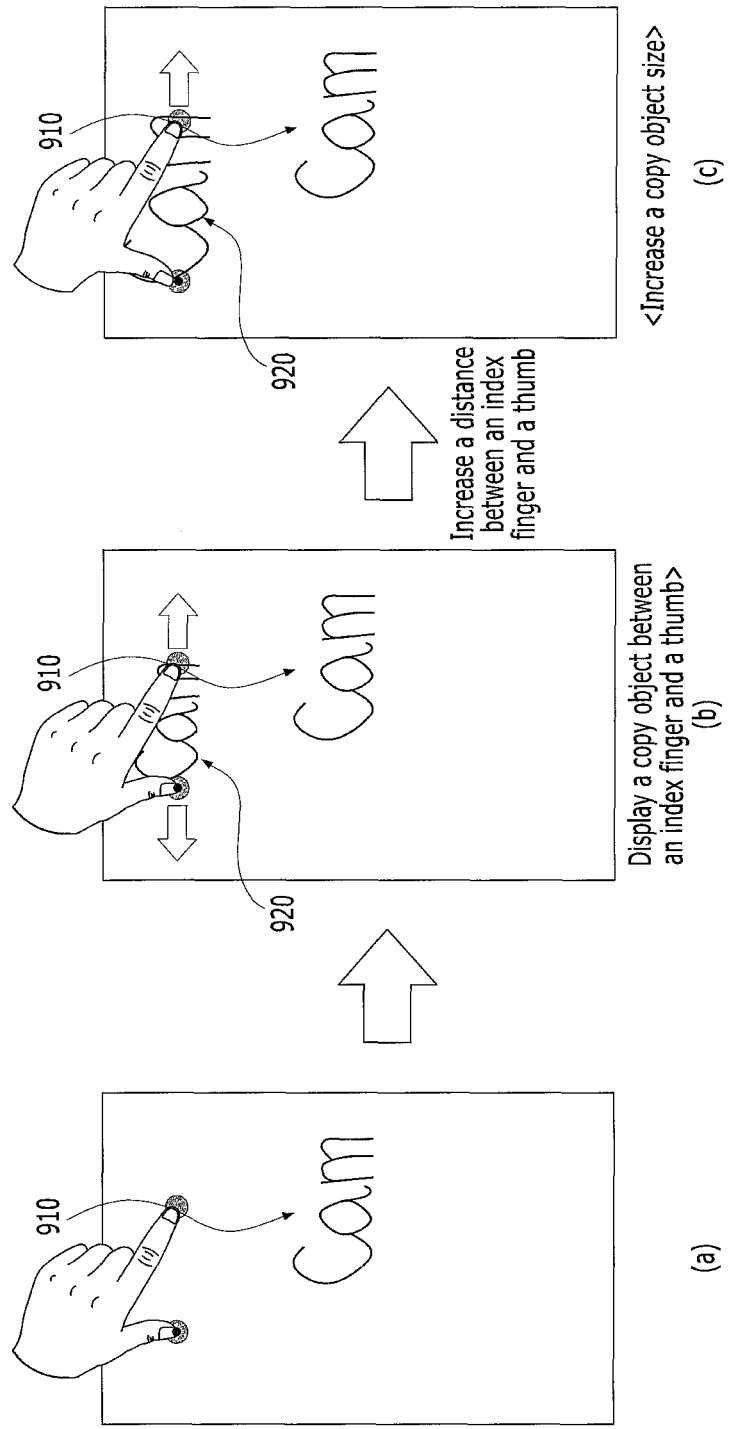

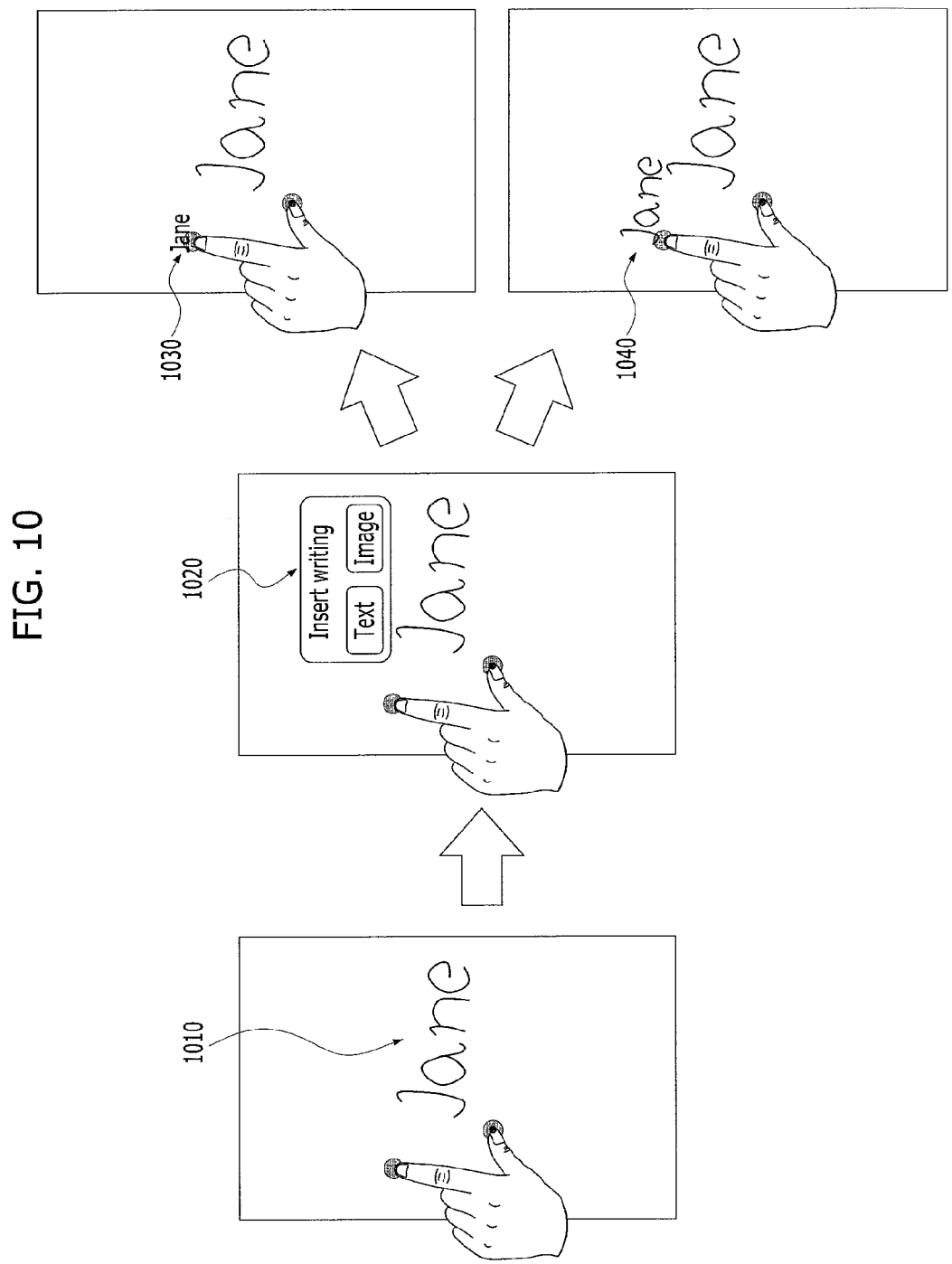

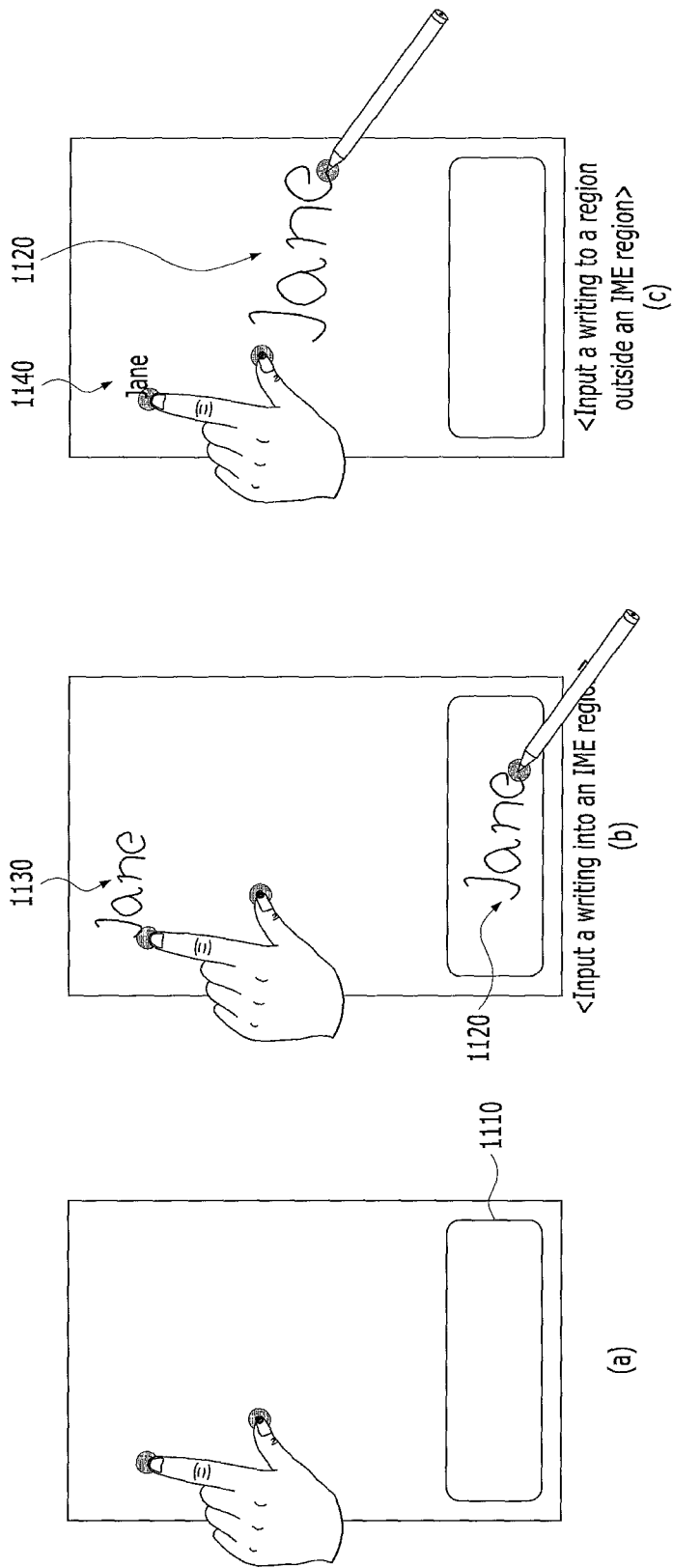

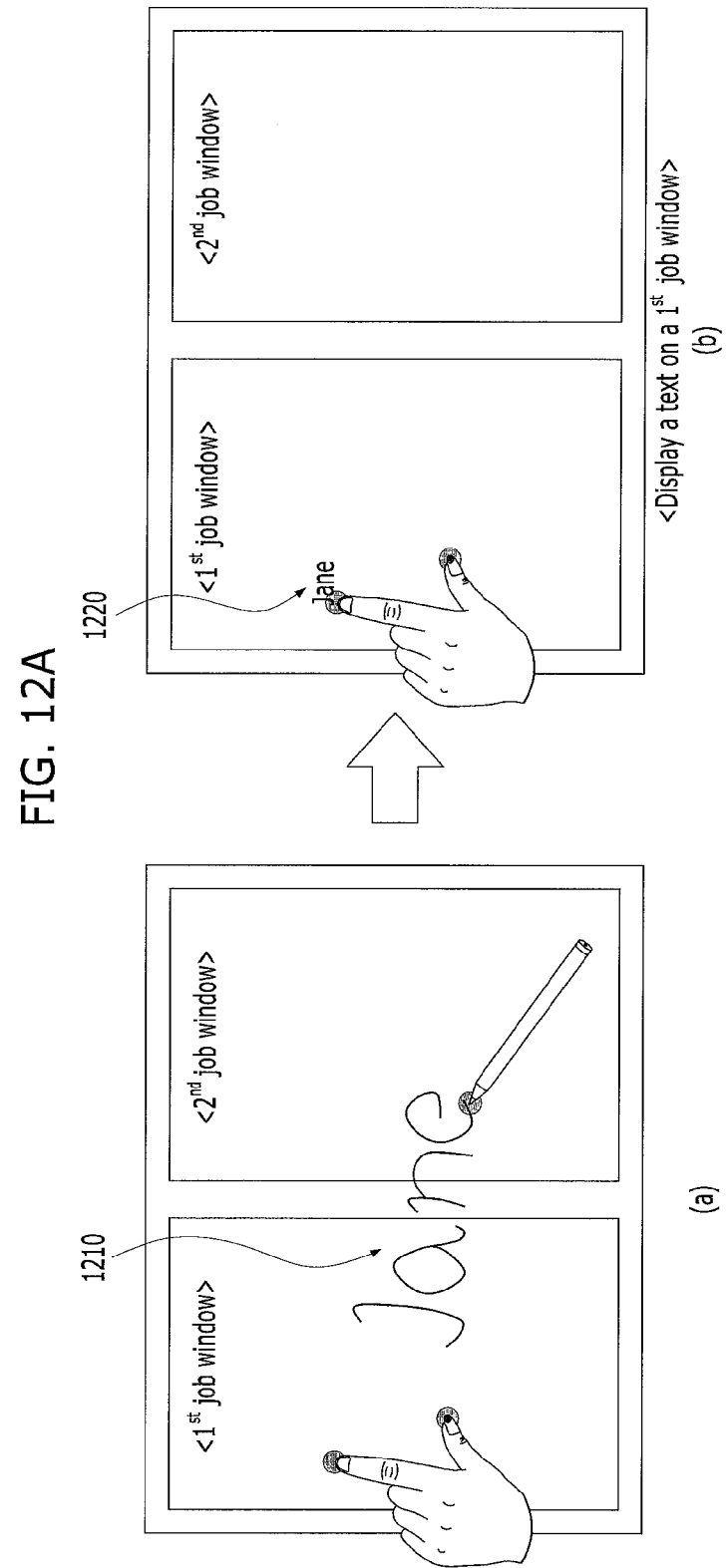

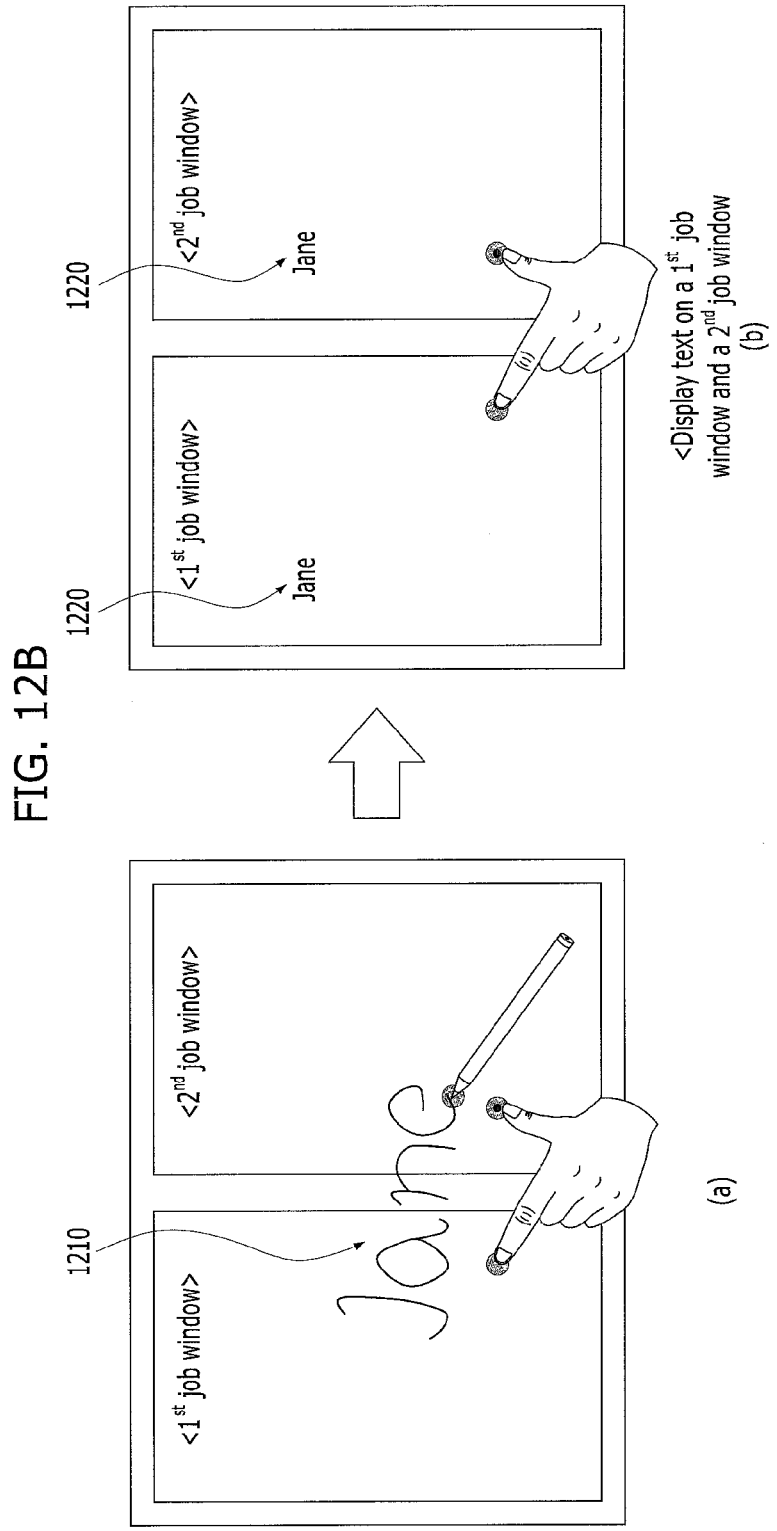

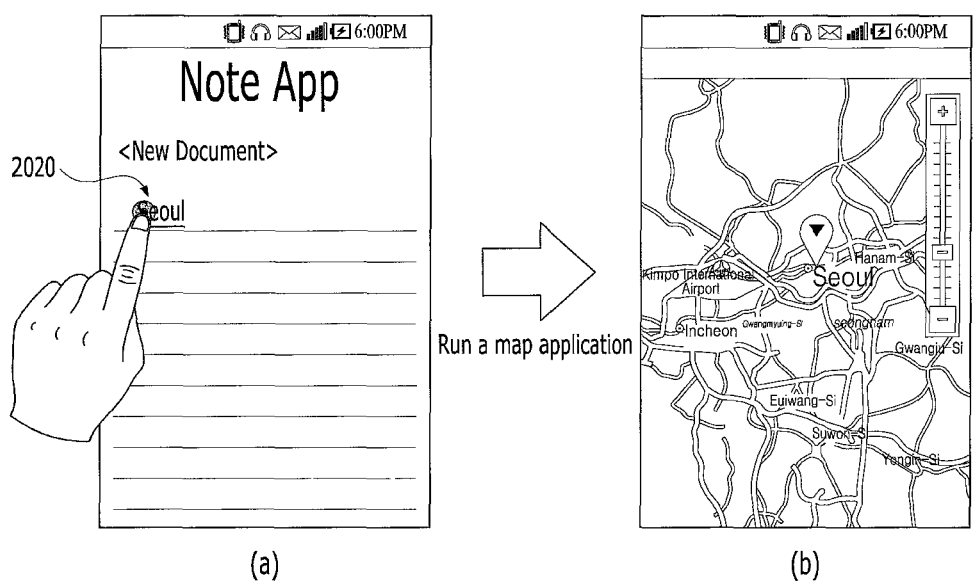

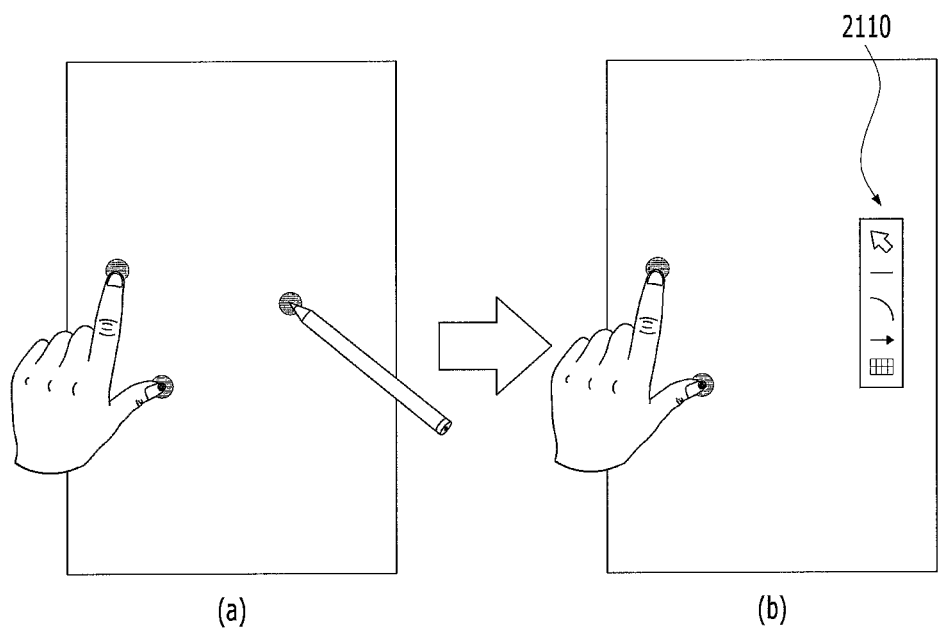

FIG. 22B
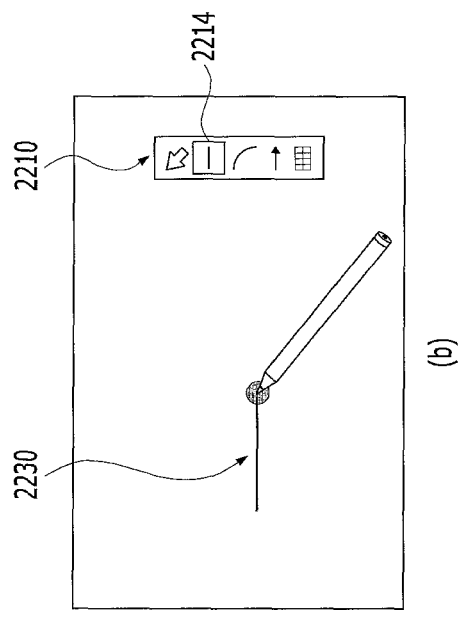
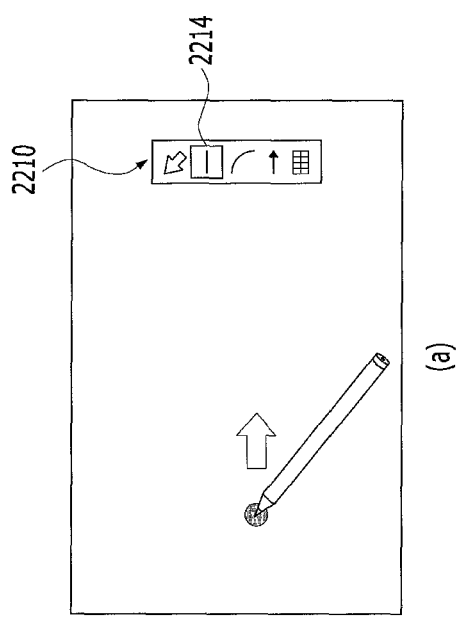

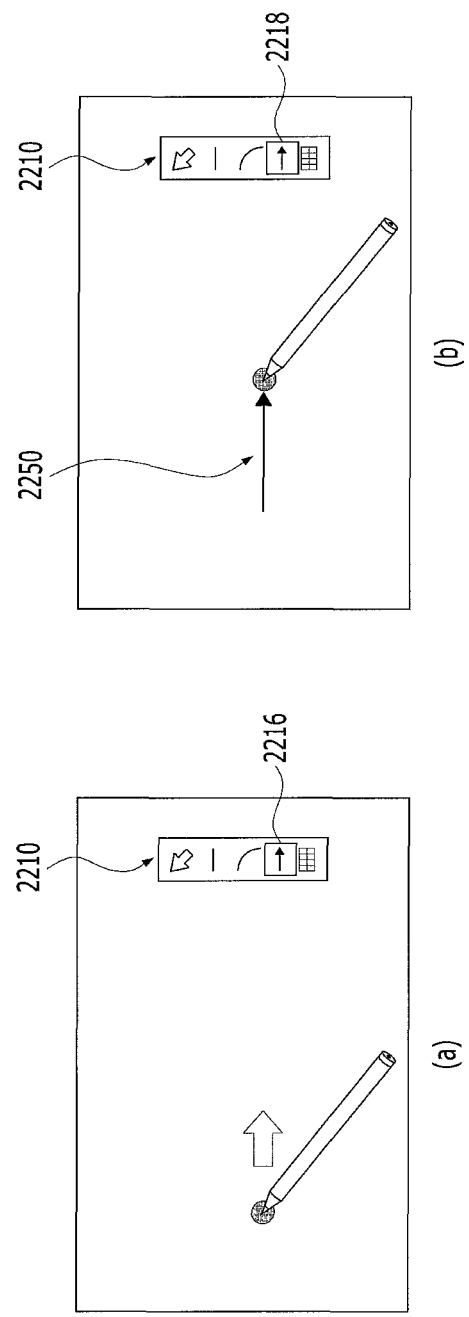

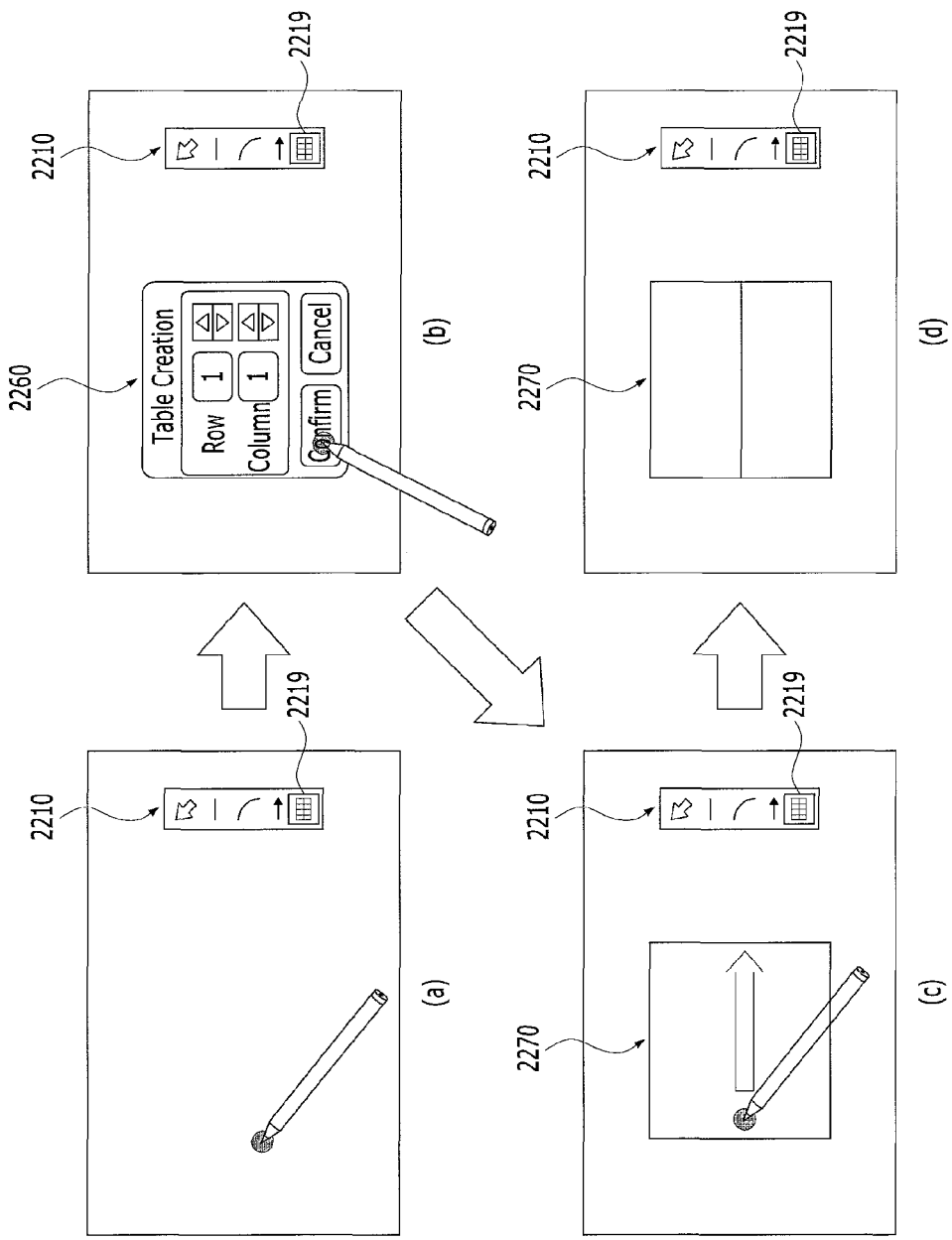

FIG. 24A
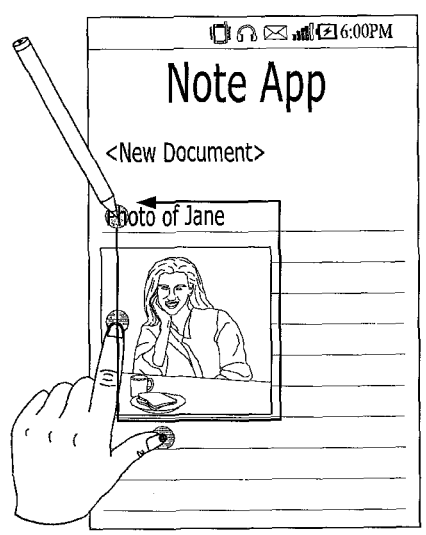
(a)
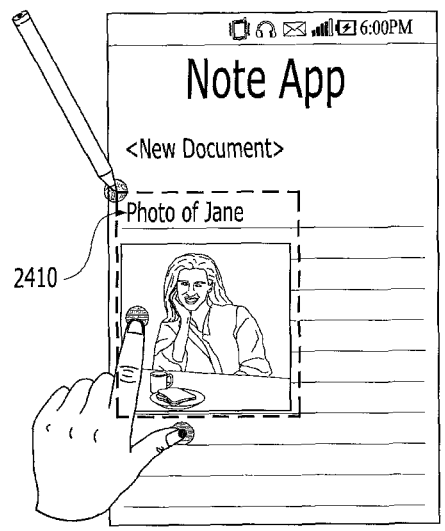
(b)

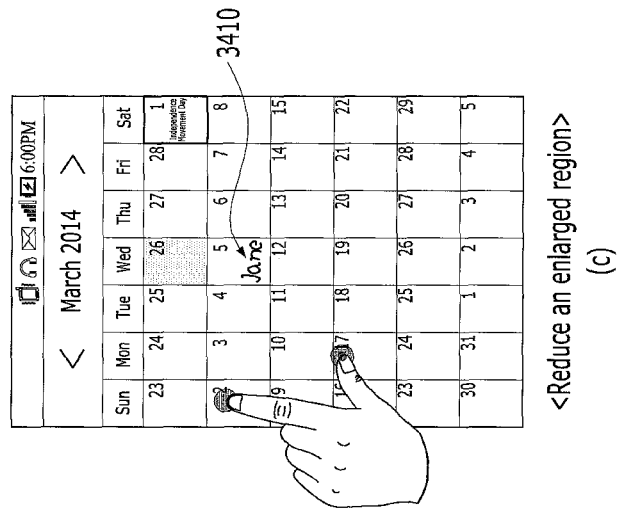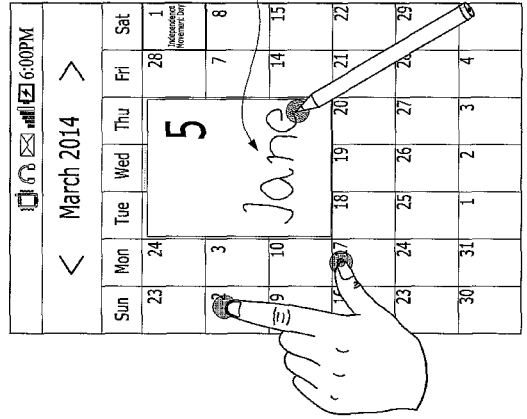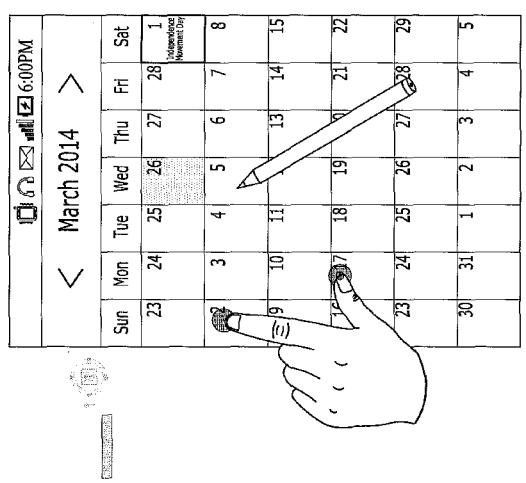
FIG. 34

MOBILE TERMINAL AND CONTROLLING METHOD THEREOF

CROSS-REFERENCE TO RELATED APPLICATION

This application claims priority under 35 U.S.C. § 119 to Korean Application No. 10-2014-0053437 filed on May 2, 2014, whose entire disclosure is hereby incorporated by reference.

BACKGROUND

1. Field

The present invention relates to a mobile terminal, and more particularly, to a mobile terminal and controlling method thereof. Although the present invention is suitable for a wide scope of applications, it is particularly suitable for easily inputting a writing using at least two pointers.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, as most of mobile terminals employ touchscreens, a writing input is spotlighted as information input method. Yet, since it is necessary to clarify whether a touch input of touching a touchscreen is provided for inputting a writing or running a general function, it is unable to input a writing to a related art mobile terminal until an application for a writing input is run or a button for switching a mode of the mobile terminal to a writing input mode or the like is pushed.

If a user input is required for inputting a writing, usability for a writing input is reduced. Therefore, the present invention intends to disclose a mobile terminal capable of facilitating a writing input without the above-mentioned manipulation.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which a writing input is facilitated using at least two pointers.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen configured to receive a touch input, and a controller, if the touch input with a main pointer is received while the touch input with at least one auxiliary pointer is maintained, configured to control a writing object drawn along a touch trace of the main pointer to be displayed on the touchscreen.

In another aspect of the present invention, a method of controlling a mobile terminal according to the present invention may include receiving a touch input from at least one auxiliary pointer and if a touch input with a main pointer is received while the touch input with the at least one auxiliary pointer is maintained, displaying a writing object drawn along a touch trace of the main pointer on the touchscreen.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein:

FIGS. 6A to 6C are diagrams for one example of changing a color of a writing object by an additional gesture with an auxiliary pointer according to the present invention;

FIG. 7 is a diagram for one example that a writing object disappears from a display unit;

FIG. 9A and FIG. 9B are diagrams for one example of displaying a copy object according to the present invention;

FIG. 10 is a diagram for one example of displaying a selection menu for selecting one of a text corresponding to a writing object and a copy object of copying the writing object according to the present invention;

FIG. 11 is a diagram for another example of selectively displaying one of a text corresponding to a writing object and a copy object of copying the writing object according to the present invention;

FIGS. 12A to 12C are diagrams for one example of displaying a text corresponding to a writing object according to the present invention;

FIGS. 20A to 20D are diagrams for one example of setting up a hyperlink to a specific application at a text according to the present invention;

FIG. 21 is a diagram for one example of displaying a tool box used in inputting a writing by a touch with a main pointer according to the present invention;

FIGS. 22A to 22F are diagrams to describe a drawing tool;

FIG. 24A and FIG. 24B are diagrams for one example of setting a copy region according to the present invention;

FIG. 34 is a diagram for one example of enlarging a field selected by a proximity touch with a main pointer and then inserting a writing object into the enlarged field according to the present invention.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
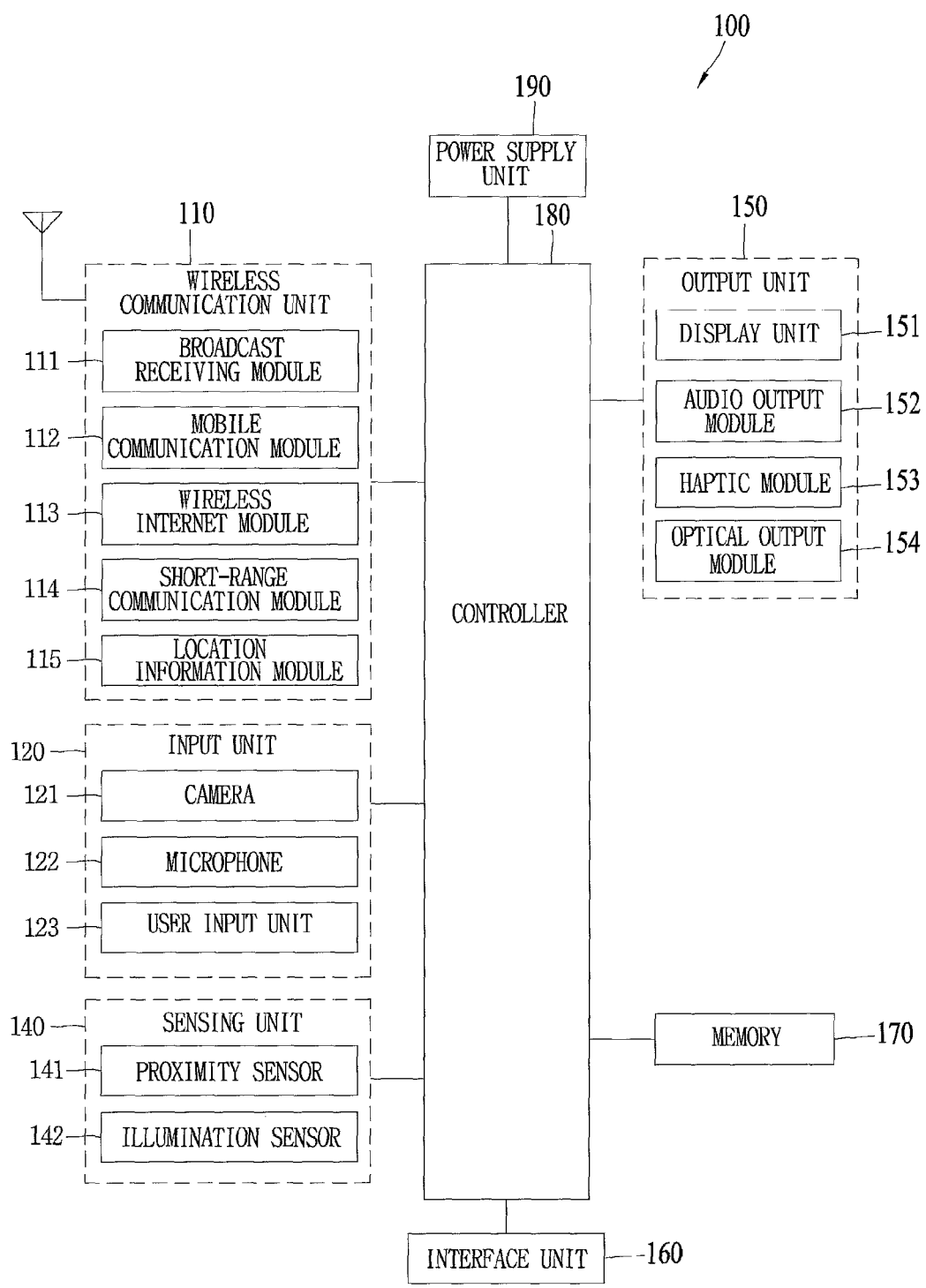
FIG. 1A is a block diagram of a mobile terminal in accordance with the present disclosure.
Figure 1B:
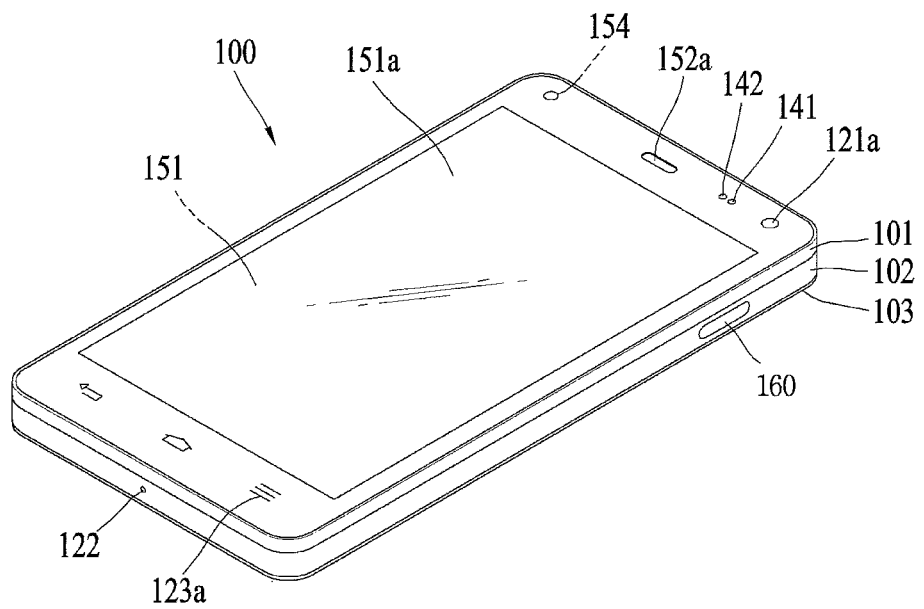
FIGS. 1B and 1C are conceptual views of one example of the mobile terminal, viewed from different directions.
Figure 1C:
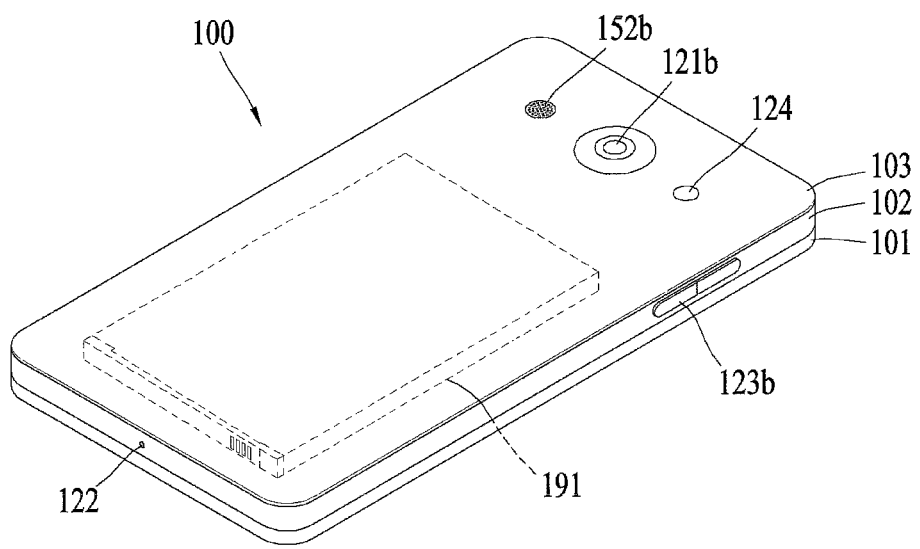

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access); Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

For clarity and convenience of the following description, assume that a mobile terminal 100 according to the present invention includes at least one of the components shown in FIGS. 1A to 1C. In particular, assume that the mobile terminal 100 according to the present invention includes the display unit 151 and the controller 180.

If the display unit 151 of the mobile terminal 100 according to the present invention includes a touchscreen, implementation of the present invention can be further facilitated. Hence, in the following description, assume that the display unit 151 includes the touchscreen. In this case, the mobile terminal 100 according to the present invention is able to receive a touch input through the display unit 151. In particular, if the display unit 151 is touched with a pointer such as a finger, a palm, a stylus pen or the like, the controller 180 is able to recognize that a touch input has been inputted based on a variation of electrostatic capacitance of the display unit 151, a pressure applied to the display unit 151 or the like. The terminology 'pointer' used in the present invention may mean one of various objects (e.g., a pointer such as a finger, a palm, a stylus pen, etc.) capable of applying a touch input to the display unit 151.

In doing so, using at least one of a variation pattern of the electrostatic capacitance of the display unit 151, a contact size of a pointer on the display unit 151, a communication with a stylus pen and the like, the controller 180 can distinguishably recognize whether the display unit 151 is touched with the stylus pen, whether the display unit 151 is touched with an object other than the stylus pen, or the like. If it is checked whether the display unit 151 is touched with the stylus pen for the communication with the stylus pen, a communication module (e.g., a wireless communication chip supportive of a short range communication such as Bluetooth or the like, etc.) configured to communicate with the mobile terminal 100 may be provided to the stylus pen. For instance, the controller 180 can distinguish a case of touching the display unit 151 with a finger from a case of touching the display unit 151 with a stylus pen.

Moreover, the controller 180 may be able to distinguish whether the stylus pen touching the display unit 151 is a specific stylus pen. In this case, the specific stylus pen may include a stylus pen previously registered at the mobile terminal 100 (e.g., a stylus pen of which identification information is registered at the mobile terminal 100, etc.) or a stylus pen of a specific manufacturer. Based on an identification information of the stylus pen received from the corresponding stylus pen or a manufacturer information of the stylus pen, the controller 180 can check whether the display unit 151 is touched with the specific stylus pen.

A button configured to be pushed by a user can be provided to the stylus pen. Based on a difference between an electrostatic capacitance on touching the display unit 151 with the stylus pen in the course of pushing the button and an electrostatic capacitance on touching the display unit 151 with the stylus pen in the course of not pushing the button, the controller 180 can check whether the button of the stylus pen touching the display unit 151 is pushed. Alternatively, through a communication with the stylus pen, the controller 180 can check whether the button of the stylus pen touching the display unit 151 is pushed.

For another example, it is able to design a stylus pen such that both ends of the stylus pen can be used. In this case, both of the ends of the stylus pen may differ from each other in thickness. Hence, based on differences between a case of touching the display unit 151 with one of the two ends of the stylus pen and a case of touching the display unit 151 with the other in electrostatic capacitance and contact size, the controller 180 may be able to recognize that a specific one of the two ends of the stylus pen touches the display unit 151.

According to the embodiments mentioned in the following description, assume that the controller 180 can determine whether the display unit 151 is touched with a stylus pen. On this assumption, the stylus pen shall be named a main pointer. And, a pointer other than the stylus pen shall be named an auxiliary pointer. By taking a finger as one example of the auxiliary pointer, the following embodiments shall be described for clarity. Yet, it is not mandatory for the auxiliary pointer to include the finger.

On the contrary to the above assumption, a pointer other than a stylus pen may be set as a main pointer and a stylus pen may be set as an auxiliary pointer.

The embodiments mentioned in the following description are applicable to a case that a main pointer and an auxiliary pointer include a specific stylus pen and a pointer other than the specific stylus pen, respectively.

Based on the above-mentioned assumptions, the mobile terminal according to the present invention is described in detail as follows.

Figure 2:
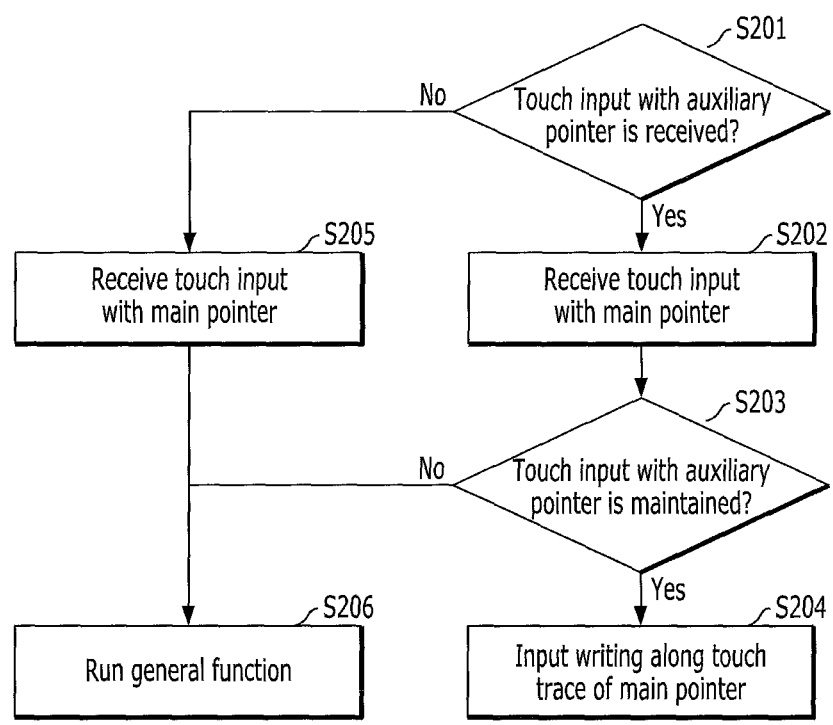
FIG. 2 is a flowchart for an operation of a mobile terminal according to the present invention.

FIG. 2 is a flowchart for an operation of a mobile terminal according to the present invention.

Referring to FIG. 2, a preset touch input with an auxiliary pointer is received [S201]. While the touch input with the auxiliary pointer is maintained without being released, if a touch input of touching the display unit 151 with a main pointer is received [S202, S203], the controller 180 can control a writing object, which is drawn along a touch trace of the main pointer, to be displayed [S204].

On the other hand, if a preset touch input with an auxiliary pointer is not received or a touch input of touching the display unit 151 with a main pointer is received after releasing the preset touch input with the auxiliary pointer [S205], the controller 180 can control a general function to be run in accordance with a touch type of the main pointer [S206].

In this case, the preset touch input with the auxiliary pointer may include one of various input examples including an input of touching the display unit 151 with a plurality of auxiliary pointers (e.g., fingers, etc.), an input of drawing a trance of a preset pattern with the auxiliary pointer, and the like. Moreover, the action of maintaining the touch input with the auxiliary pointer may mean one of an action of touching the display unit 151 with at least one or more auxiliary pointers and maintaining the touch state without releasing the auxiliary pointer(s), an action of drawing a trace of a preset pattern on the display unit 151 using an auxiliary pointer and then maintaining the touch state without releasing the auxiliary pointer, and the like.

An operation of the mobile terminal 100 in case of receiving a touch input with a main pointer in the course of maintaining a touch input with an auxiliary pointer and an operation of the mobile terminal 100 in case of receiving a touch input with a main pointer in the course of not maintaining a touch input with an auxiliary pointer are described in detail with reference to the accompanying drawings as follows.

Figure 3:
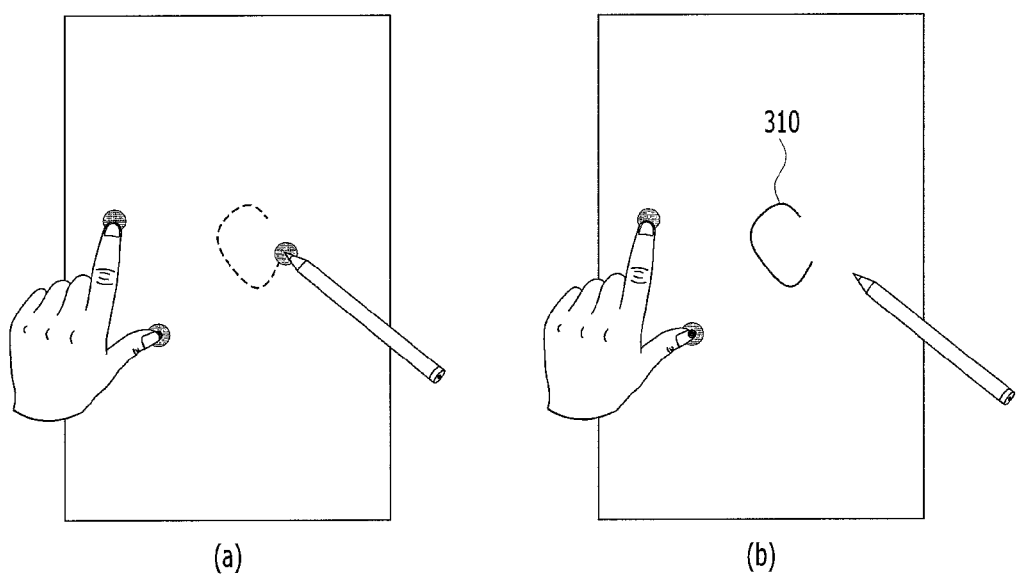
FIG. 3 and FIG. 4 are diagrams for examples to describe an operation of a mobile terminal depending on whether a touch input within an auxiliary pointer is maintained on touching a display unit with a main pointer according to the present invention.
Figure 4:
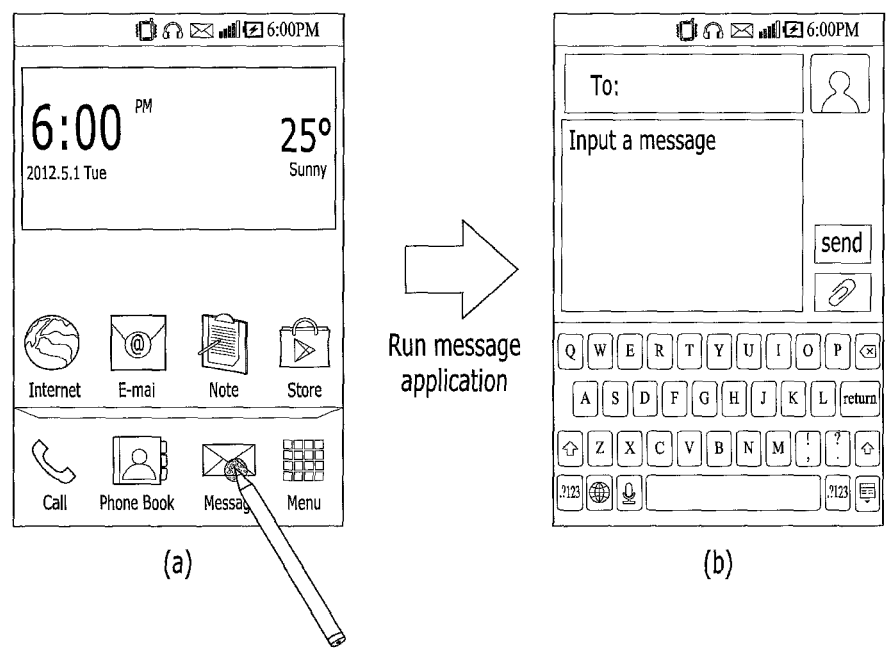

FIG. 3 and FIG. 4 are diagrams for examples to describe an operation of a mobile terminal depending on whether a touch input within an auxiliary pointer is maintained on touching a display unit with a main pointer according to the present invention.

For clarity of the following description with reference to FIG. 3, assume that an auxiliary pointer is a finger. And, assume that a touch to the display unit 151 with two fingers is currently maintained.

Referring to FIG. 3, while the display unit 151 is touched with two fingers, if a touch input with a stylus pen is received [FIG. 3(a)], the controller 180 can control a writing object 310, which is drawn along a moving trace of the stylus pen, to be displayed [FIG. 3(b)].

Referring to FIG. 4, while the display unit 151 is not touched with two fingers, if a touch input with a stylus pen is received [FIG. 4(a)], the controller 180 can control a general function to be run in accordance with a touch pattern of the stylus pen. For instance, referring to FIG. 4(b), while the display unit 151 is not touched with two fingers, if an application icon is touched with a stylus pen, the controller 180 can control an application mapped to the selected icon to be run.

In particular, like the examples shown in FIG. 3 and FIG. 4, the controller 180 can recognize a touch input with a main pointer in the course of maintaining a touch input with an auxiliary pointer as a writing input. If a touch input with a main pointer is received in the course of maintaining a touch input with an auxiliary pointer, the controller 180 can run a general function (e.g., a function of running an application (if an icon is touched), a function of turning a page (flicking), a function of switching to a state (mode) for re-disposing an icon (a long touch to a vacant region of a home screen), a function of moving a display location of an icon (dragging a main pointer in the course of long touching an icon), etc.) for controlling an operation of the mobile terminal 100.

In particular, an action of applying a preset touch input with an auxiliary pointer may be recognized as an action for enabling the mobile terminal 100 to enter a state capable of receiving an input of a writing from a stylus pen. Hence, a user can input a writing through a stylus pen by applying a preset touch input through an auxiliary pointer only.

While a writing object drawn along a touch trace of a main pointer is displayed, if an addition touch input with an auxiliary pointer currently touching the display unit 151 is applied, the controller 180 may control the writing object to be deleted or may control a color of the writing object to be changed. In doing so, the additional touch input with the auxiliary pointer may include an input of dragging an auxiliary pointer currently touching the display unit 151 in a prescribed direction, an input of dragging at least one of a plurality of auxiliary pointers currently touching the display unit 151 in a prescribed direction, an input of decreasing and increasing (or, increasing and decreasing) a distance between two auxiliary pointers currently touching the display unit 151, or the like, by which the additional touch input is non-limited.

An embodiment for deleting a writing object and an embodiment for changing a color of a writing object are described in detail with reference to the accompanying drawings as follows.

Figure 5:
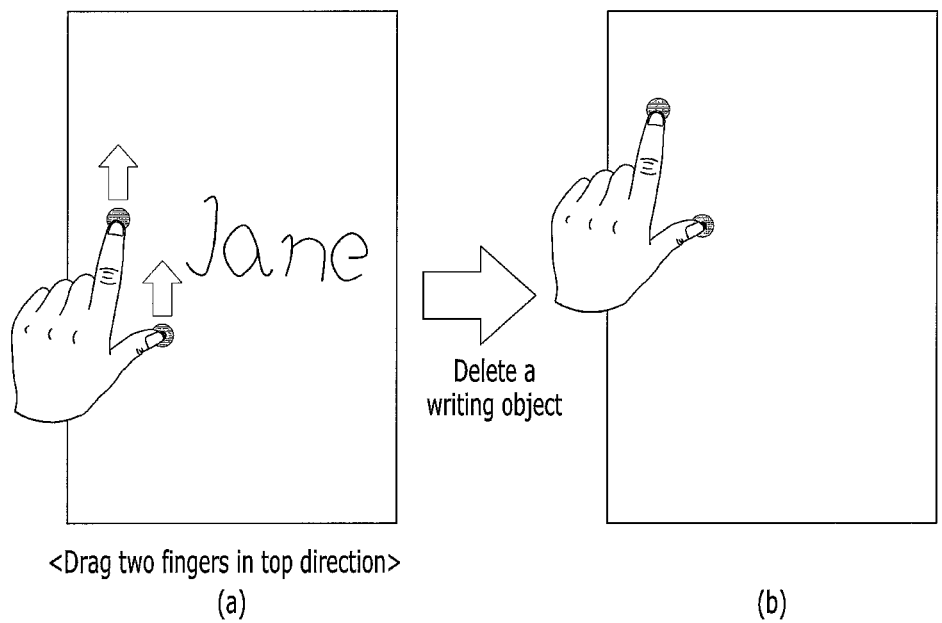
FIG. 5 is a diagram for one example of deleting a writing object by an additional touch input with an auxiliary pointer according to the present invention.

FIG. 5 is a diagram for one example of deleting a writing object by an additional touch input with an auxiliary pointer according to the present invention. For clarity of the following description, assume that an additional touch input is an input of dragging two fingers currently touching the display unit 151 in a prescribed direction.

Referring to FIG. 5, while a writing object drawn with a stylus pen is displayed, if two fingers currently touching the display unit 151 are dragged in a prescribed direction [FIG. 5(a)], the controller 180 can control the writing object 510 drawn with the stylus pen to be deleted [FIG. 5(b)]. As the existing writing object 510 is deleted, a user may be able to secure a space enough to input a new writing.

Figure 6A:
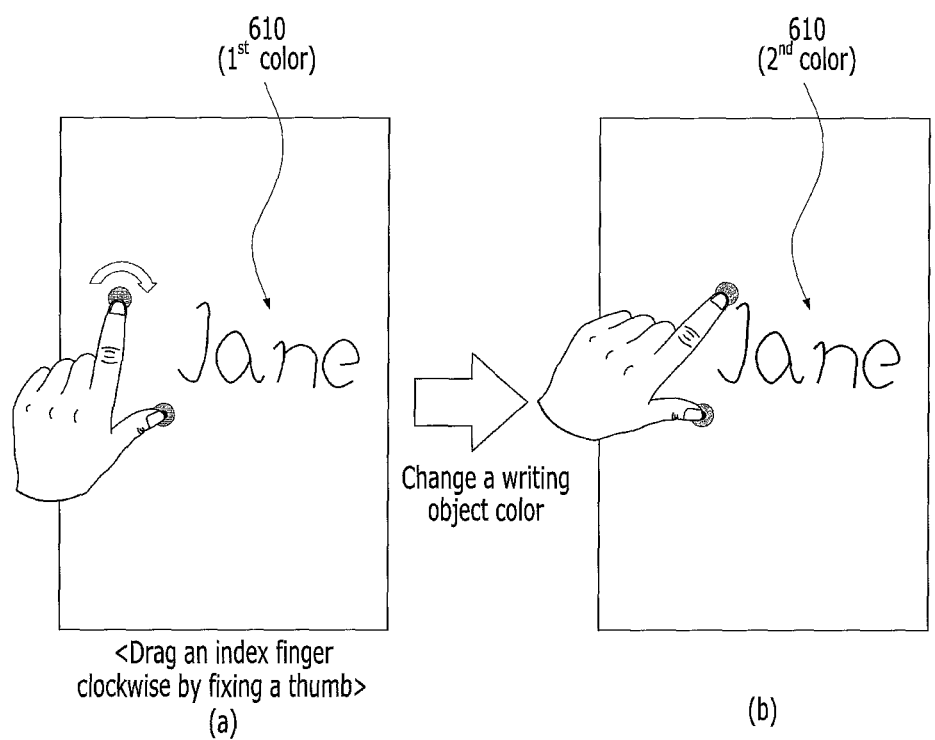
Figure 6C:
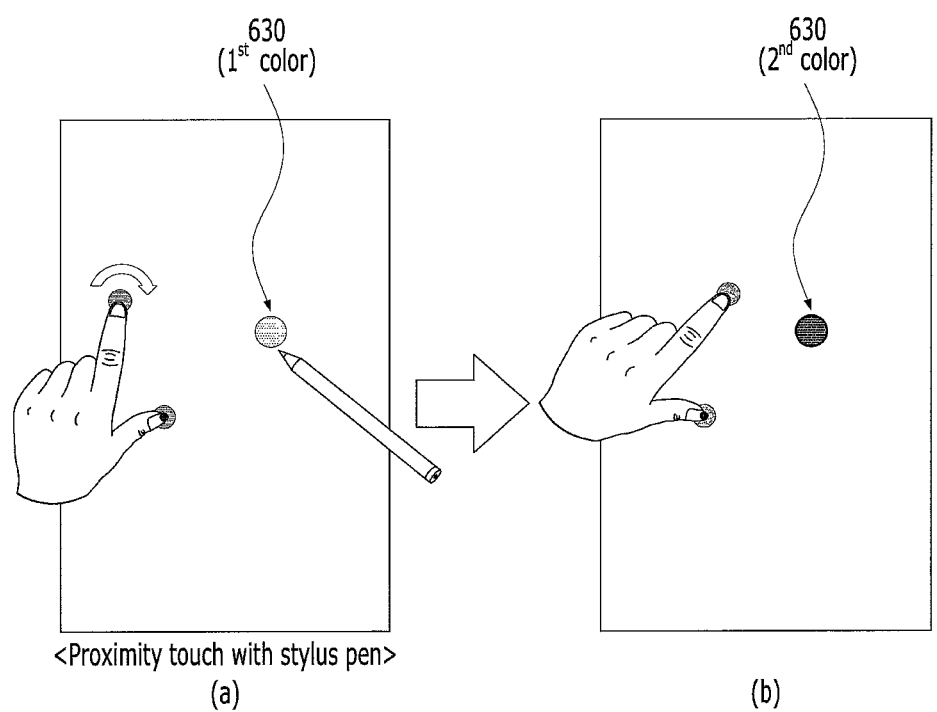

FIGS. 6A to 6C are diagrams for one example of changing a color of a writing object by an additional gesture with an auxiliary pointer according to the present invention. For clarity of the following description, assume that an additional touch input is an input of dragging one of two fingers currently touching the display unit 151 in a prescribed direction.

Referring to FIG. 6A, while a writing object 610 drawn with a stylus pen is displayed, if one of two fingers currently touching the display unit 151 is dragged in a prescribed direction [FIG. 6(a)], the controller 180 can control a color of the writing object 610 drawn with the stylus pen to be changed [FIG. 6A(b)]. When the order of changing the color has been determined already, if one of the two fingers is dragged in a prescribed direction, the controller 180 can change the color in ascending order. If one of the two fingers is dragged in a direction opposite to the prescribed direction, the controller 180 can change the color in descending order. In doing so, the controller 180 may be able to adjust a brightness (or chroma) depending on a distance between the two fingers. For instance, if the distance between the two fingers increases, the controller can increase the brightness. For another instance, if the distance between the two fingers decreases, the controller can decrease the brightness.

For another instance, referring to FIG. 6B, if one of two fingers is dragged in a prescribed direction [FIG. 6B(a)], the controller 180 can control a color table 620, which is provided to adjust a color of a writing object 610, to be displayed around the other finger [FIG. 6B(b)]. Thereafter, if the other fingers selects a specific color from the color table 620, referring to FIG. 6B(c), the controller 180 can control the color of the writing object 610 to be adjusted into the color selected by the other finger.

If a main pointer approaches the display unit 151, the controller 180 can guide a color of a writing that will be inputted by a main pointer.

For instance, while the display unit 151 is touched with two fingers, if a stylus pen approaches the display unit 151, referring to FIG. 6C(a), the controller 180 can control a writing object 630, which is in a color of a writing object 610 to be drawn in response to a touch with the stylus pen, to be displayed at a location on the display unit 151 corresponding to a proximate location of the stylus pen. If a user input shown in FIG. 6A or FIG. 6B is received, referring to FIG. 6C(b), the controller 180 may be able to control a color of the writing object 630 to be changed. If the display unit 151 is touched with the stylus pen, the controller 180 may control the writing object 610, which is in the same color of the writing object 630, to be displayed.

While another preset touch input with an auxiliary pointer is maintained, if a writing is inputted by a main pointer, the controller 180 displays a writing object in the first place. After the elapse of a prescribed time, the controller 180 can control the writing object to automatically disappear from the display unit 151.

For instance, FIG. 7 is a diagram for one example that a writing object disappears from a display unit. For clarity of the following description, assume that another preset touch input is an input of touching the display unit 151 with a palm.

Referring to FIG. 7(a), while the display unit 151 is touched with a palm, if a touch input with a stylus pen is received, the controller 180 can control a writing object 710, which is drawn along a touch trace of the stylus pen, to be displayed.

Referring to FIG. 7(b), if a prescribed time elapses from a timing point of drawing the writing object 710, the controller 180 can control the writing object 710 to gradually disappear from the display unit 151.

Like the example shown in FIG. 7, while the display unit 151 is touched with the palm, if a user inputs a writing using a stylus pen, it is able to prevent a writing content to be exposed to other users.

Thereafter, referring to FIG. 7(c), if the palm is released from the display unit 151, the controller 180 can control the disappearing object 710 to be displayed again.

For another instance, if the palm is released from the display unit 151, the controller 180 may be able to create a capture image created from capturing an output of the display unit 151 including the disappearing writing object 710.

According to the example mentioned in the foregoing description, while a touch input with an auxiliary pointer is maintained, if a touch input with a main pointer is received, the controller 180 can control a writing object 710, which is drawn along a touch trace of the main pointer, to be displayed. Thereafter, if the touch input with the auxiliary pointer is released, the controller 180 may create a capture image created from capturing an output of the display unit 151 including the writing object 710. Yet, although the touch with the auxiliary pointer is released, it is not necessary for the capture image, which is created from capturing an output of the display unit 151, to be created.

The controller 180 may additionally display a text read out by applying a text recognition algorithm to a writing object, a copy of the writing object and the like as well as the writing object. In this case, a display location of the text and a display location of the copy object of the writing object may be determined in accordance with a touch location of an auxiliary pointer. This is described in detail with reference to the accompanying drawings as follows.

Figure 8A:
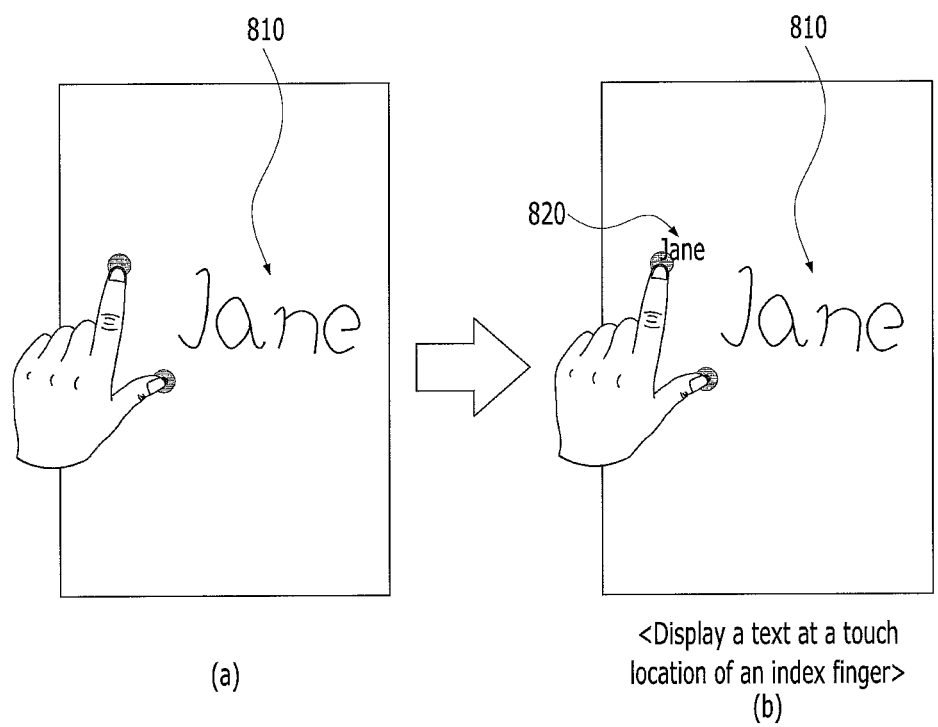
FIG. 8A and FIG. 8B are diagrams for one example of displaying a text corresponding to a writing object according to the present invention.
Figure 8B:
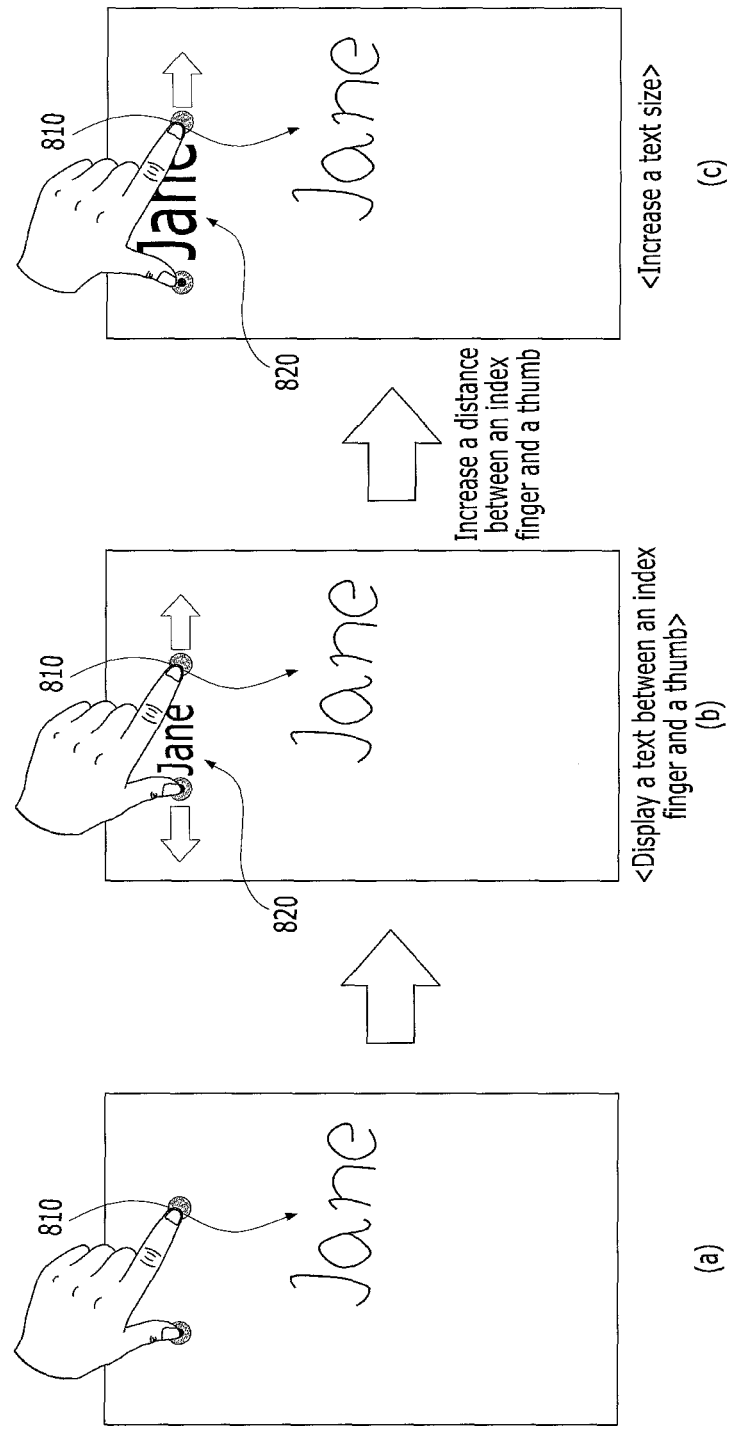

FIG. 8A and FIG. 8B are diagrams for one example of displaying a text corresponding to a writing object according to the present invention.

Referring to FIG. 8A, if a writing is drawn along a touch trace of a stylus pen, the controller 180 can control a text 820 corresponding to a writing object 810 to be displayed at a touch location of a finger. For one example, while a touch input with two fingers is maintained, if a writing is drawn along a moving trace of a stylus pen [FIG. 8A (a)], the controller 180 can control a text 820 corresponding to a writing object 810 to be displayed at a touch location of a specific one of the two fingers (e.g., an upper (or lower) touch location, a larger (or smaller) touch location, etc.) or a touch location of a randomly selected one of the two fingers [FIG. 8A(b)]. According to the example shown in FIG. 8A(b), the text 820 corresponding to the writing object 810 is displayed at a location indicated by the index finger of the two fingers. On the other hand, while the display unit 151 is touched with one finger, if a writing is drawn along a moving trace of a stylus pen, the controller 180 may control the text 820 corresponding to the writing object 810 to be displayed at a touch location of the corresponding finger [not shown in the drawing].

For another example, referring to FIG. 8B, while a touch input with two fingers is maintained, if a writing is drawn along a moving trace of a stylus pen [FIG. 8B a)], the controller 180 can control a text 820 corresponding to a writing object 810 to be displayed between the two fingers. In doing so, the controller 180 may adjust a size (i.e., a font size) of the text 820 depending on a distance between the touch points of the two fingers [FIG. 8B(b)]. For instance, as the state shown in FIG. 8B(b) is changed into the state shown in FIG. 8B(c), if a distance between the touch points of the two fingers increases, the controller 180 can control a size of the text 820 to increase.

On the other hand, while a touch input with a single finger is maintained, if a writing is drawn along a moving trace of a stylus pen, the controller 180 may control a text corresponding to a writing object to be displayed at a touch location of the corresponding finger [not shown in the drawing].

According to the examples shown in FIG. 8A and FIG. 8B, a text corresponding to a writing object is displayed at a touch location of a finger. Instead of displaying a text corresponding to a writing object at a touch location of a finger, the controller 180 may control a copy object, which is created from copying a writing object, to be displayed. In this case, the copy object is a copy of the writing object and has the same configuration (i.e., the same writing content) of the writing object. Yet, the copy object may differ from an original writing object in size.

Figure 9A:
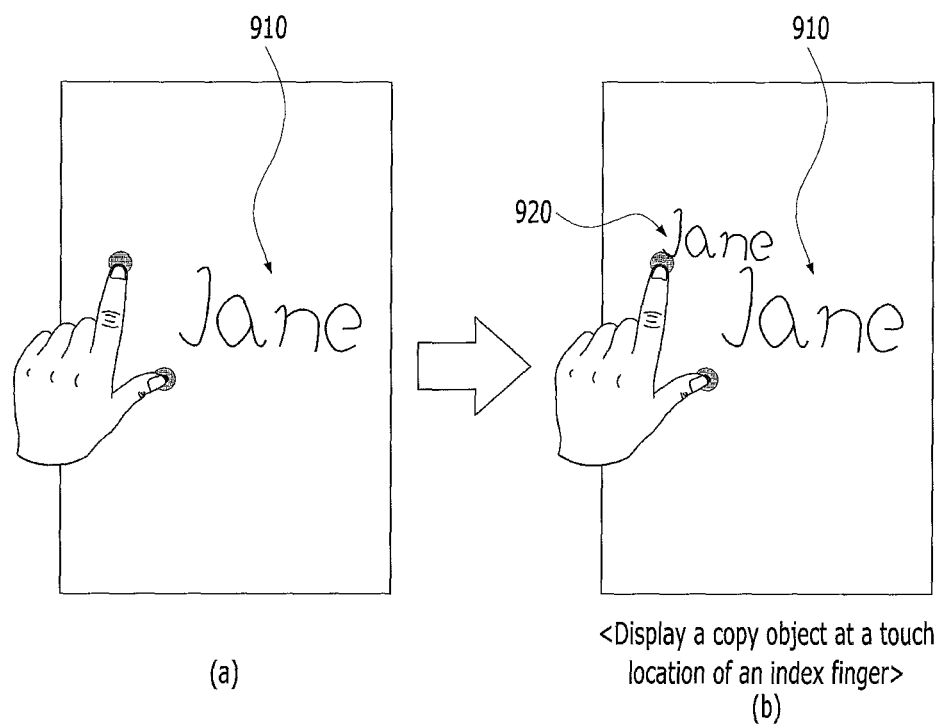

For instance, FIG. 9A and FIG. 9B are diagrams for one example of displaying a copy object according to the present invention.

Referring to FIG. 9A, if a writing is drawn along a touch trace of a stylus pen, the controller 180 can control a copy object 920 to be displayed at a touch location of a finger. For one example, while a touch input with two fingers is maintained, if a writing is drawn along a moving trace of a stylus pen [FIG. 9A(a)], the controller 180 can control a copy object 920 corresponding to a copy of a writing object 910 to be displayed at a touch location of a specific one of the two fingers (e.g., an upper (or lower) touch location, a larger (or smaller) touch location, etc.) or a touch location of a randomly selected one of the two fingers [FIG. 9A(b)]. According to the example shown in FIG. 9A(b), the copy object 920 corresponding to the copy of the writing object 910 is displayed at a location indicated by the index finger of the two fingers.

For another example, referring to FIG. 9B, while a touch input with two fingers is maintained, if a writing is drawn along a moving trace of a stylus pen [FIG. 9B a)], the controller 180 can control a copy object 920 corresponding to a copy of a writing object 910 to be displayed between the two fingers [FIG. 9B(b)]. In doing so, the controller 180 may adjust a size (i.e., a font size) of the copy object 920 depending on a distance between the touch points of the two fingers. For instance, as the state shown in FIG. 9B(b) is changed into the state shown in FIG. 9B(c), if a distance between the touch points of the two fingers increases, the controller 180 can control a size of the copy object 920 to increase.

After displaying a selection menu for selecting one of a text corresponding to a writing object and a copy object corresponding to a copy of the writing object at a location indicated by a finger, the controller 180 can control one of the text and the copy object to be selectively displayed based on a user input to the selectin menu.

For instance, FIG. 10 is a diagram for one example of displaying a selection menu for selecting one of a text corresponding to a writing object and a copy object of copying the writing object according to the present invention.

Referring to FIG. 10, while the display unit 151 is touched with two fingers, if a stylus pen touches the display unit 151, the controller 180 can control a writing, which is drawn along a moving trace of the stylus pen, to be displayed. If the writing is inputted, the controller 180 can control a selection menu 1020, which is provided to select an object to insert at a location indicated by one of the two fingers or between the two fingers, to be displayed. A text button in the selection menu 1020 may be an item for selecting a text corresponding to a writing object 1010, while an image button in the selectin 1020 may be an item for selecting a copy object corresponding to a copy of the writing object 1010. In response to a user input to the selection menu 1020, the controller 180 can display either a text 1030 corresponding to the writing object or a copy object 1040 corresponding to a copy of the writing object 1010.

For another example, the controller can selectively display one of a text and a copy object by distinguishing a case of inputting a writing through a dedicated region set for a writing input with a stylus pen from a case of inputting a writing through a region other than the dedicated region.

For instance, FIG. 11 is a diagram for another example of selectively displaying one of a text corresponding to a writing object and a copy object of copying the writing object according to the present invention.

Referring to FIG. **11(*a*), if a preset touch input with an auxiliary pointer is inputted, the controller 180 can assign a partial region of the display unit 151 as an IME (input method editor) region 1110 for inputting a writing. If a writing is inputted in a manner of touching the IME region 1110 with a stylus pen, referring to FIG. 11(*b*), the controller 180 can control a copy object 1130 corresponding to a copy of a writing object 1120 to be displayed. On the other hand, if a writing is inputted in a manner of touching a region outside the IME region 1110 with a stylus pen, referring to FIG. 11(*c*), the controller 180 may control a text 1140 corresponding to the writing object 1120** to be displayed.

On the contrary to the examples shown in FIG. **11(*b*) and FIG. 11(*c*), if a writing is inputted in a manner of touching an inside of the IME region 1110 with a stylus pen, the controller 180 may control the text 1140 corresponding to the writing object 1120 to be displayed. If a writing is inputted in a manner of touching an outside of the IME region 1110 with a stylus pen, the controller 180 may control the copy object 1130 corresponding to a copy of the writing object 1120** to be displayed.

For another instance, the controller 180 according to the present invention may adjust a display location of a text or a copy object by distinguishing a case of touching a region inside an IME region with a stylus pen from a case of touching a region outside the IME region with the stylus pen.

For example, if a writing is inputted in a manner of touching an inside of an IME region with a stylus pen, like the examples shown in FIG. 8A and FIG. 10A, a text or a copy object is controlled to be displayed at a location indicated by one of two fingers. If a writing is inputted in a manner of touching an outside of the IME region with a stylus pen, like the examples shown in FIG. 8B and FIG. 10B, a text or a copy object is controlled to be displayed between the two fingers. On the other hand, if a writing is inputted in a manner of touching the inside of the IME region with a stylus pen, like the examples shown in FIG. 8B and FIG. 10B, a text or a copy object can be controlled to be displayed between the two fingers. If a writing is inputted in a manner of touching the outside of the IME region with a stylus pen, like the examples shown in FIG. 8A and FIG. 10A, a text or a copy object can be controlled to be displayed at a location indicated by one of the two fingers.

For another example, in accordance with an attribute of a currently run task, the controller 180 may selectively input one of a text corresponding to a writing object and a copy object corresponding to a copy of the writing object. For instance, if a currently run task is to receive an input of a text only (e.g., a task of running a webpage including a search window for receiving an input of a text based search word for a web search, a phonebook search task including a search window for receiving a text based search word to search characters registered at a phonebook, a task of displaying a dial screen for receiving an input of a phone number of a counterpart to make a phone call to, etc.), the controller can control a text corresponding to a writing object to be inputted. If a currently run task is to receive an input of an image only (e.g., a painting task for drawing a picture, a photo editing task for adding a writing to a currently viewed photo, etc.), the controller 180 can control a copy object corresponding to a copy of a writing object to be run. In case that a currently run task is capable of handling both a text and an image (e.g., a document editing task capable of receiving inputs of both a text and an image, an email composing task capable of receiving inputs of both a text and an image, a message (MMS) composing task capable of receiving inputs of both a text and an image, etc.), like the example shown in FIG. 10, a selection menu for selecting one of a text corresponding to a writing object and a copy object corresponding to a copy of the writing object is displayed and one of them can be then selected based on a user input to the selection menu.

According to the example shown in one of FIG. 8A, FIG. 8B, FIG. 10A and FIG. 10B, a text of a copy object can be displayed at a location indicated by one of two fingers or between the two fingers. Unlike the examples shown in the corresponding drawings, the controller 180 can control a text or a copy object to be inserted at a location (e.g., a location of a cursor appearing in the course of editing a document, etc.) set to have a text or an image to be inputted thereto.

For another instance, while a plurality of task windows are displayed in the mobile terminal 100, if a writing is inputted, the controller 180 can control a text corresponding to a writing object and a copy object corresponding to a copy of the writing object to be inputted to the task window selected by a finger. This is described in detail with reference to FIGS. 12A to 12C as follows.

Figure 12C:
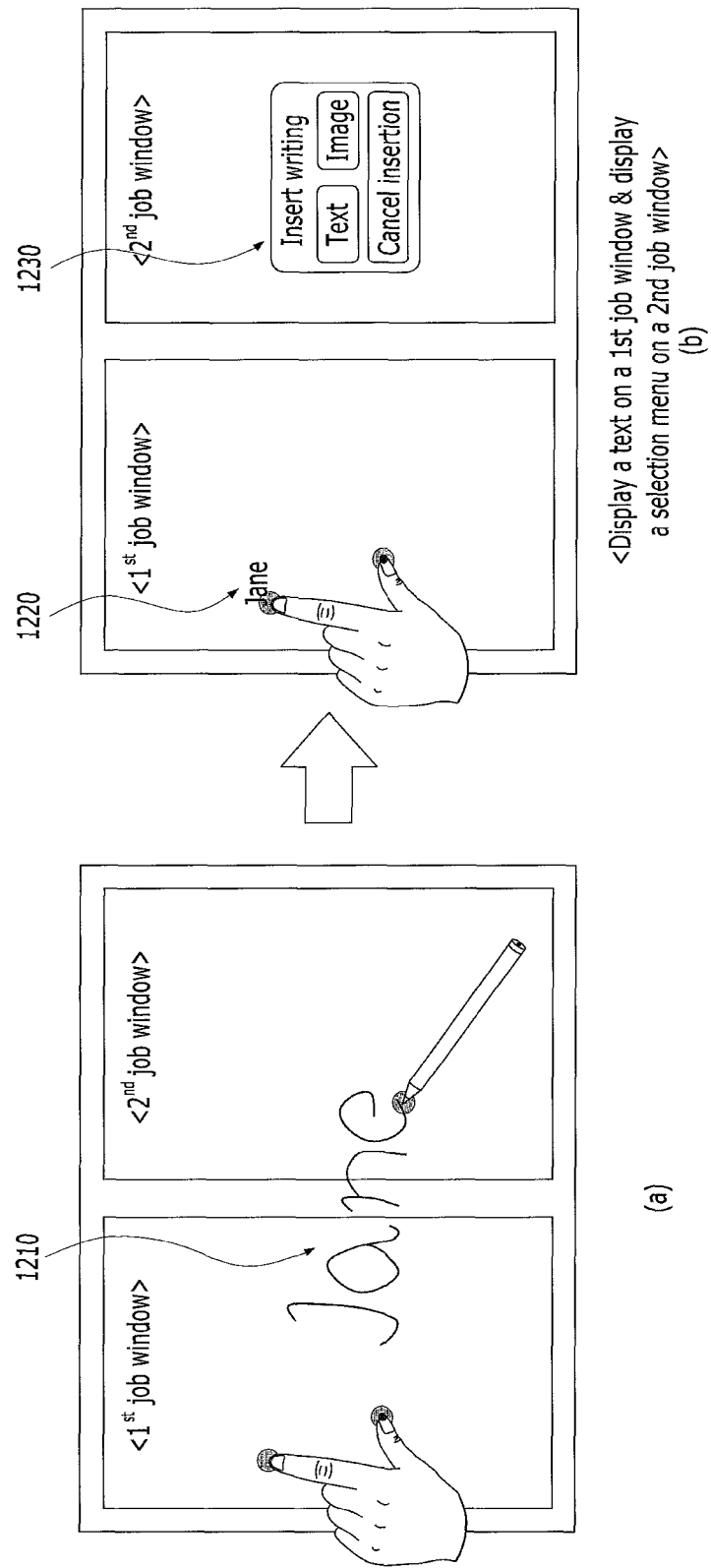

FIGS. 12A to 12C are diagrams for one example of displaying a text corresponding to a writing object according to the present invention.

Referring to FIG. 12A, while a touch input with two fingers is maintained, if a writing is drawn along a moving trace of a stylus pen and both touch locations of the two fingers are located within one of task windows [FIG. 12A(a)], the controller 180 can control a text 1220 corresponding to a writing object 1210 to be inputted to the task window currently touched with the two fingers [FIG. 12A(b)].

On the other hand, referring to FIG. 12B, while a touch input with two fingers is maintained, if a writing is drawn along a moving trace of a stylus pen and touch locations of the two fingers are located within different task windows, respectively [FIG. 12B(a)], the controller 180 can control a text 1220 corresponding to a writing object 1210 to be inputted to all the task windows (i.e., tow task windows) currently touched with the two fingers [FIG. 12B(b)].

According to the examples shown in FIG. 12A and FIG. 12B, the text 1220 corresponding to the writing object 1210 is inputted to the task window(s) touched with the finger(s). Yet, it is a matter of course that a copy object corresponding to a copy of the writing object 1210 can be inserted in the task window(s) touched with the finger(s). As mentioned in the foregoing description with reference to FIG. 10, it is able to display a selection menu 1230 for determining whether to input a text 1220 corresponding to a writing object 1210 or a copy object corresponding to a copy of the writing object 1210 to a task window indicated by a finger. Moreover, like the example shown in FIG. 11, based on the selection menu 1230 or the IME region, it is a matter of course that one of the text 1220 and the copy object can be selectively displayed.

Like the example shown in FIG. 12A, if the text 1220 corresponding to the writing object 1210 is applied to one of a plurality of the task windows, the controller 180 can control the selection menu 1230, which is provided to determine whether to insert the text 1220 corresponding to the writing object 1210 (or the copy text) in the rest of the task windows, to be displayed.

For instance, referring to FIG. 12C, while a touch input with two fingers is maintained within a prescribed task window, if a writing is drawn along a moving trace of a stylus pen [FIG. 12C(a)], the controller 180 can control a text 1220 corresponding to a writing object 1210 to be inputted to the task window currently touched with the two fingers [FIG. 12C(b)]. In doing so, like the example shown in FIG. 12C(b), the controller 180 can control a selection menu 1230, which is provided to determine whether to insert the text 1220 corresponding to the writing object 1210 (or the copy text) in the rest of the task windows currently not touched with the finger, to be displayed.

Based on a user input to the selection menu 1230 shown in FIG. 12C(b), the controller 180 can determine whether to insert the text 1220 corresponding to the writing object 1210 (or the copy text) in the rest of the task windows. For example, in the selection menu 1230 shown in FIG. 12C(b), a text button may indicate to insert the text 1220 to the rest of the task windows and an image button may indicate to insert the copy object in the rest of the task windows. And, an insertion cancel button may indicate to insert nothing in the rest of the task windows.

According to the examples shown in FIGS. 12A to 12C, while the display unit 151 is touched with two fingers, a writing is inputted with a stylus pen. Unlike the examples, while a touch input with a single finger is maintained, if a writing is drawn along a moving trace of a stylus pen, the controller 180 can control a text 1220 corresponding to a writing object 1210 to be inputted to a task window currently touched with the finger.

Based on an attribute of a task currently run in each task window, the controller 180 can determine whether to insert a text corresponding to a writing object or a copy object derived from the writing object to each task window.

Figure 13:
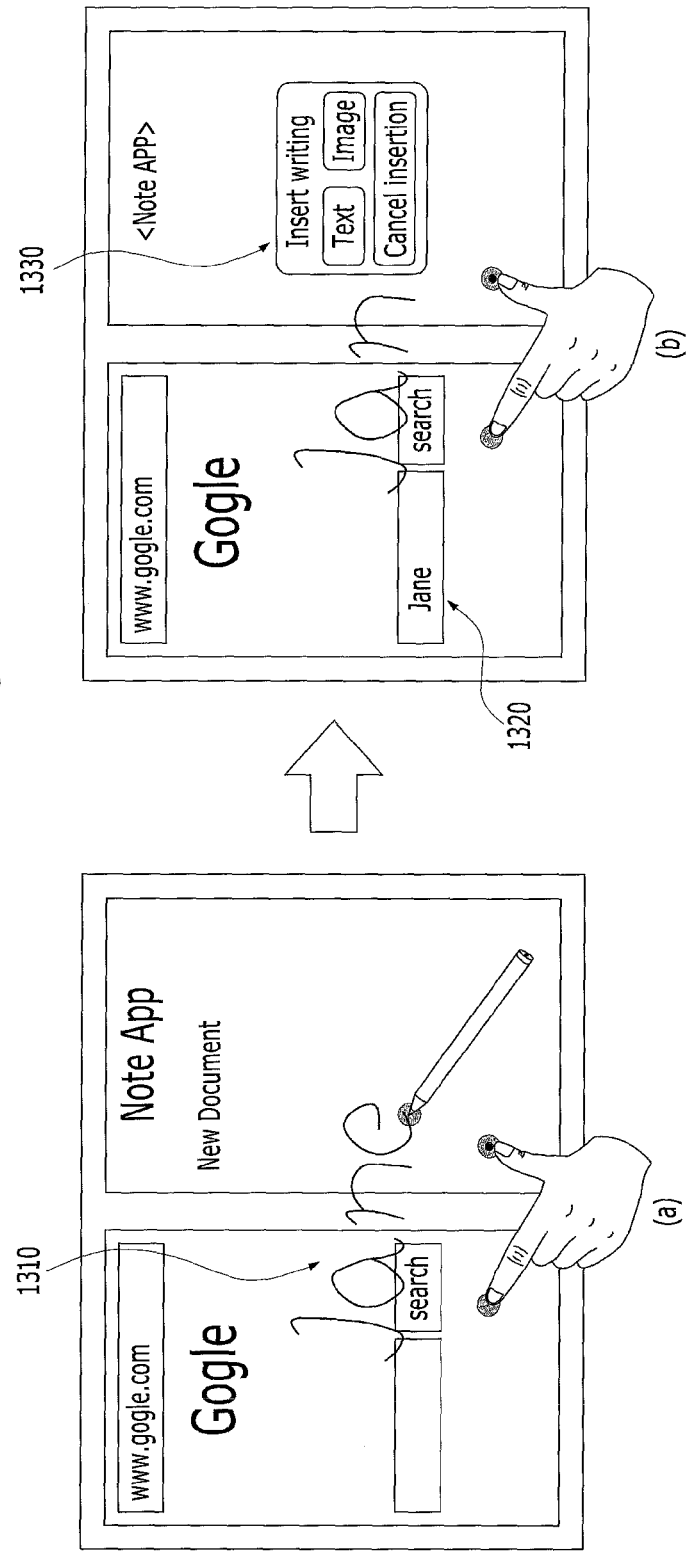
FIG. 13 is a diagram for one example of inserting one of a text and a copy object into each task window according to the present invention.

FIG. 13 is a diagram for one example of inserting one of a text and a copy object into each task window according to the present invention. For clarity of the following description, assume that a webpage including a search window for receiving an input of a text based search word is currently run in a first region of the display unit 151. And, assume that a note application capable of text and image attachments is currently run in a second region of the display unit 151.

Referring to FIG. 13(a), while a first region and a second region are touched with two fingers, respectively, if a writing with a stylus pen is inputted, the controller can control one of a text 1320 corresponding to a writing object 1310 and a copy object corresponding to a copy of the writing object 1310 to be inserted in each of the first region and the second region.

In doing so, if a search window of the first region is activated (i.e., a cursor is blinking on the search word), referring to FIG. 13(b), the controller 180 can control the text 1320 corresponding to the writing object 1310 to be inputted to the search word capable of receiving an input of a text based search word. The reason for this is that since the search window operates to receive an input of the text 1320, it is unable to insert a copy object of an image type in the search window.

On the other hand, since the note application in the second region can attach both of the text 1320 and the image, referring to FIG. 13(*b*), the controller 180 can control a selection menu 1330, which is provided to select one of the text 1320 corresponding to the writing object 1310 and the copy object corresponding to the copy of the writing object 1310, to be displayed on the second region. Based on a user input to the selection menu 1330 shown in FIG. 13(*b*), the controller 180 may be able to insert one of the text 1320 corresponding to the writing object 1310 and the copy object corresponding to the copy of the writing object 1310 in the second task window.

While a task capable of handling both of the text 1320 and the image is run in each of the first region and the second region, the controller 180 may control the selection menu 1330, which is provided to select one of the text 1320 corresponding to the writing object 1310 and the copy object corresponding to the copy of the writing object 1310, to be displayed on each of the first region and the second region.

While a touch input with an auxiliary pointer is maintained, if a writing with a main pointer is inputted, the controller 180 can control a text corresponding to a writing object to be applied to an application touched with the auxiliary pointer. In particular, after a writing has been inputted with a main pointer, if a touch input with an auxiliary pointer is released, the controller 180 can control an application to be run in a manner that a text corresponding to a writing input is applied to the application. This is described in detail with reference to the accompanying drawings as follows.

Figure 14:
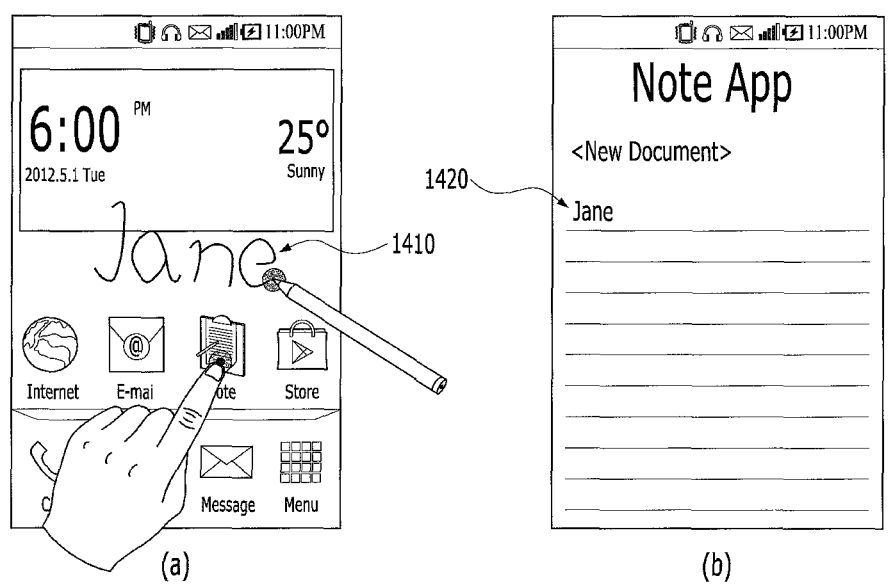
FIG. 14 is a diagram for one example of applying a text corresponding to a writing object to a note application according to the present invention.

FIG. 14 is a diagram for one example of applying a text corresponding to a writing object to a note application according to the present invention.

Referring to FIG. 14(*a*), while a note icon is touched with a finger, if the display unit 151 is touched with a stylus pen, the controller 180 can display a writing object 1410 drawn along a moving trace of the stylus pen. Thereafter, if the finger is released from the display unit 151, referring to FIG. 14(*b*), the controller 180 runs a note application and is then able to control a document, in which a text 1420 corresponding to the writing object 1410 is inserted, to be displayed.

In doing so, the controller 180 opens a new document (or, a document last edited by a user) on the note application and is able to control the text 1420 corresponding to the writing object 1410 to be automatically inserted in the new document (or, the document last edited by a user).

Figure 15:
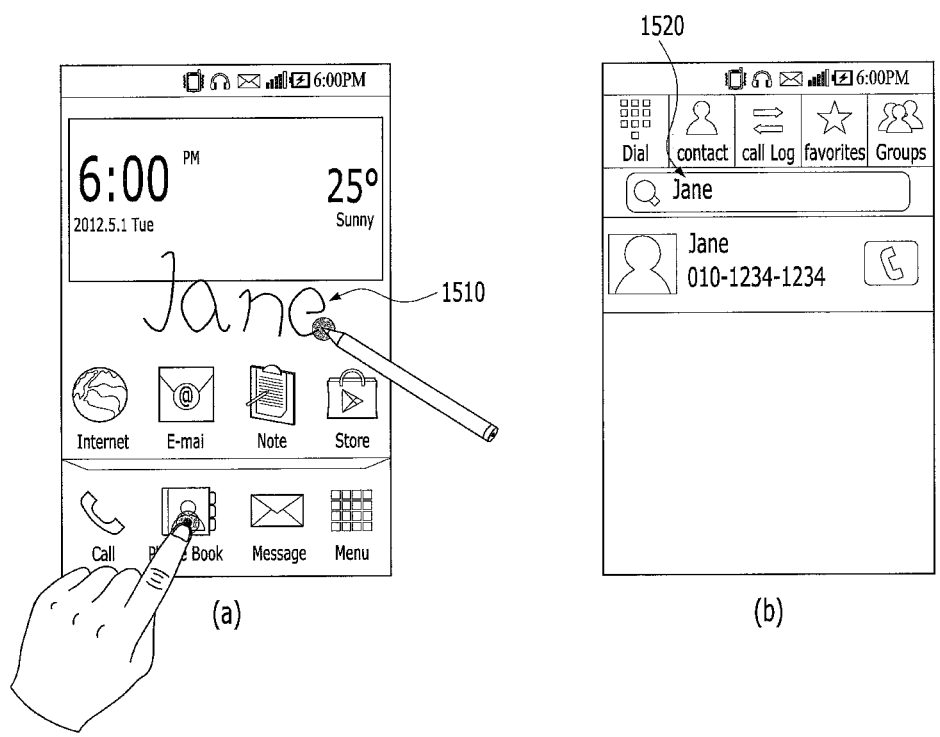
FIG. 15 is a diagram for one example of applying a text corresponding to a writing object to a phonebook application according to the present invention.

FIG. 15 is a diagram for one example of applying a text corresponding to a writing object to a phonebook application according to the present invention.

Referring to FIG. 15(*a*), while a phonebook icon is touched with a finger, if the display unit 151 is touched with a stylus pen, the controller 180 can display a writing object 1510 along a moving trace of the stylus pen. Thereafter, if the finger is released from the display unit 151, referring to FIG. 15(*b*), the controller 180 runs a phonebook application and is then able to control a search result of a character, which matches a text 1520 corresponding to the writing object 1510, to be displayed.

Figure 16:
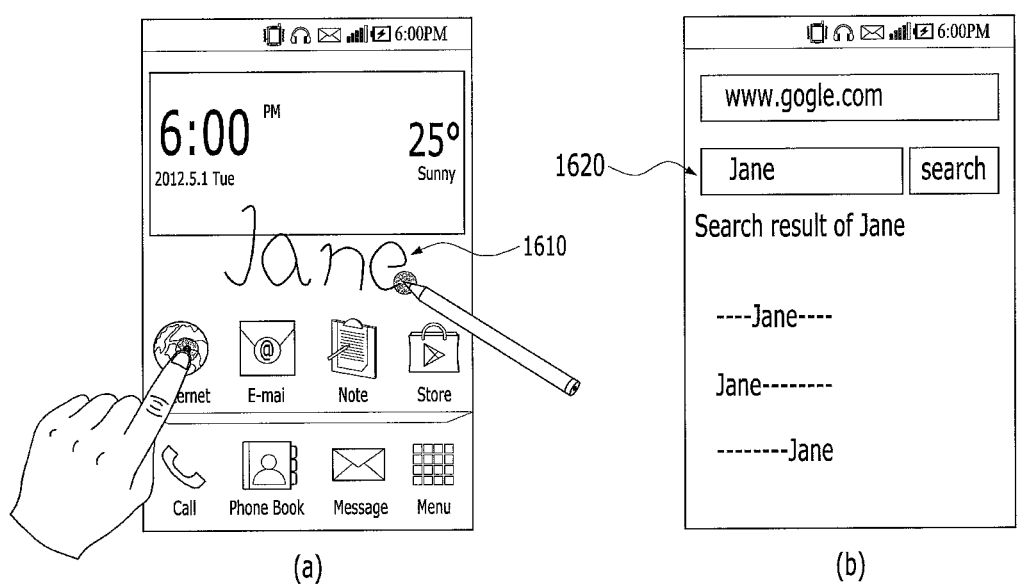
FIG. 16 is a diagram for one example of applying a text corresponding to a writing object to a web browser according to the present invention.

FIG. 16 is a diagram for one example of applying a text corresponding to a writing object to a web browser according to the present invention.

Referring to FIG. 16(*a*), while a web browser icon is touched with a finger, if the display unit 151 is touched with a stylus pen, the controller 180 can display a writing object 1610 along a moving trace of the stylus pen. Thereafter, if the finger is released from the display unit 151, referring to FIG. 16(*b*), the controller 180 runs a web browser and is then able to control a web search result of a text 1620, which corresponds to the writing object 1610, to be displayed.

The controller 180 may run the web search for the text 1620 corresponding to the writing object 1610 through a site (e.g., www.google.com, www.bing.com, www.naver.com, etc.) set as a basic searcher on the web browser, a portal site set as a home page, or the like.

Besides, while an icon of an application (e.g., a music play application, a video play application, etc.) for multimedia file play is touched with an auxiliary pointer, a writing with a main pointer may be inputted. If the touch input with the auxiliary pointer is released, the controller 180 runs the corresponding application and is able to control a multimedia file, which matches a text corresponding to a writing object, to be played.

Moreover, if a call icon is selected by an auxiliary pointer or a message icon is currently touched with the auxiliary pointer, a writing may be inputted by a main pointer. If the touch input with the auxiliary pointer is released, the controller 180 runs the corresponding application and is able to control a counterpart matching a text corresponding to a writing object to be set as a call counterpart or a message sending target.

While a message icon, an email icon or an SNS (social network service) icon is touched with an auxiliary pointer, a writing may be inputted by a main pointer. In this case, if the touch input with the auxiliary pointer is released, the controller 180 runs a corresponding application and is also able to set a text corresponding to a writing object as a text content (e.g., a text content of a message, a text content of an email, a text content of a comment to be uploaded to an SNS, etc.).

While a file icon, a folder or the like is selected by an auxiliary pointer, if a writing is inputted by a main pointer, the controller 180 may be able to change a file name or a folder name into a text corresponding to a writing object.

Figure 17:
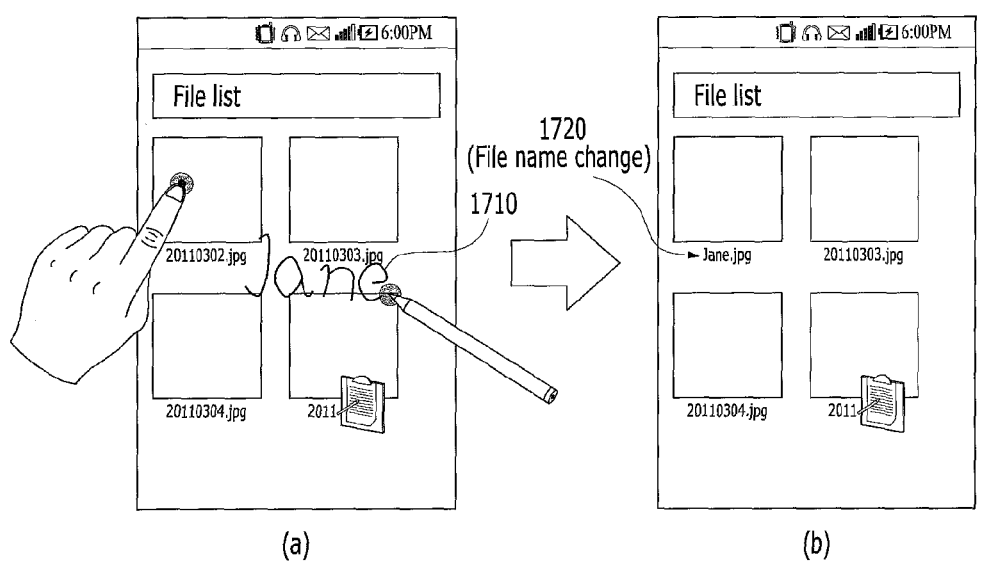
FIG. 17 is a diagram for one example of changing a file name according to the present invention.

For instance, FIG. 17 is a diagram for one example of changing a file name according to the present invention.

Referring to FIG. 17(*a*), while a file icon is touched with a finger, if the display unit 151 is touched with a stylus pen, the controller 180 can display a writing object 1710 along a moving trace of the stylus pen. Thereafter, if the finger is released from the display unit 151, referring to FIG. 17(*b*), the controller 180 runs a phonebook application and is then able to control a name 1720 of the selected file icon to be changed into a text corresponding to the writing object 1710.

The embodiments described with reference to FIGS. 14 to 17 assume the case that a writing is inputted by a main pointer in the state of maintaining a touch input with a single auxiliary pointer. The embodiments described with reference to FIGS. 14 to 17 are applicable to a case that a writing is inputted by a main pointer in a state of maintaining a touch input with a plurality of auxiliary pointers.

Figure 18:
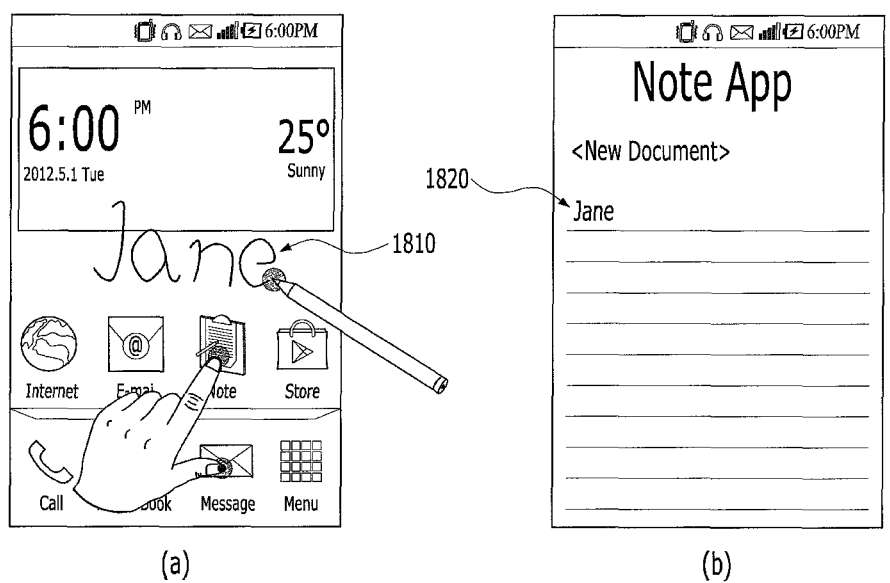
FIG. 18 is a diagram to describe one example of applying a writing object drawn along a moving trace of a stylus pen to a specific application during a touch to a display unit with two fingers.

For instance, FIG. 18 is a diagram to describe one example of applying a writing object drawn along a moving trace of a stylus pen to a specific application during a touch to a display unit with two fingers.

Referring to FIG. 18(*a*), while the display unit 151 is touched with two fingers, if the display unit 151 is touched with a stylus pen, the controller 180 can control a writing object 1810, which is drawn along a moving trace of the stylus pen, to be displayed.

Thereafter, if the touch input with the two fingers is released, the controller 180 runs an application corresponding to an icon selected by a specific one of the two fingers (e.g., an icon selected by a pointer having an upper touch location (or a lower touch location), an icon selected by a pointer having a larger touch area (or a smaller touch area), etc.) or an application corresponding to an icon corresponding to a random one of the two fingers and is then able to control a text 1820 corresponding to the writing object 1810 to be applied to the run application.

According to the example shown in FIG. 18(*b*), a note application corresponding to a note icon selected by an index finger of the two fingers is run and the text 1820 corresponding to the writing object 1810 is inserted in the document on the note application.

For another instance, the controller 180 can control a text corresponding to a writing object to be applied to applications corresponding to icons touched with two fingers, respectively.

Figure 19:
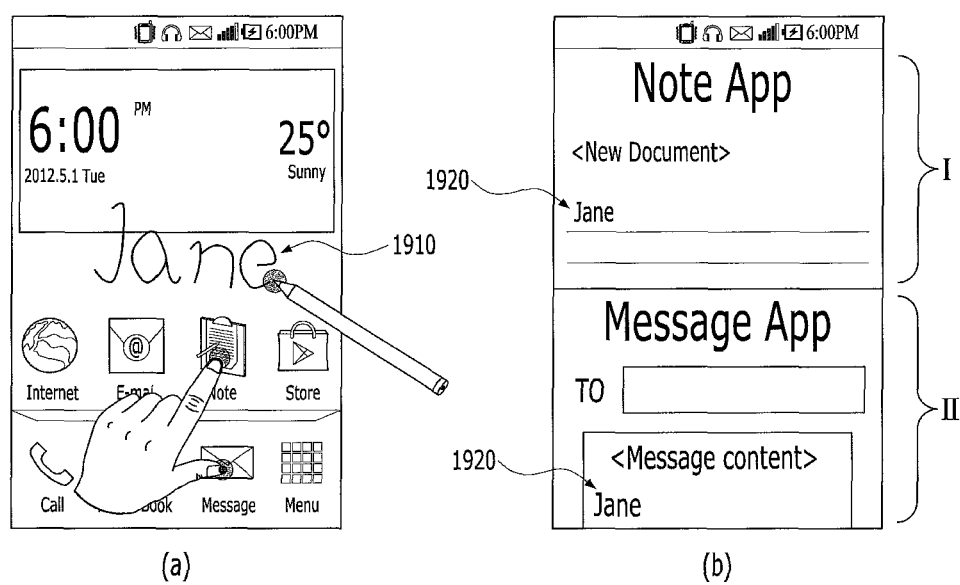
FIG. 19 is a diagram to describe another example of applying a writing object drawn along a moving trace of a stylus pen to a specific application during a touch to a display unit with two fingers.

For instance, FIG. 19 is a diagram to describe another example of applying a writing object drawn along a moving trace of a stylus pen to a specific application during a touch to a display unit with two fingers.

Referring to FIG. 19(*a*), while the display unit 151 is touched with two fingers, if the display unit 151 is touched with a stylus pen, the controller 180 can control a writing object 1910, which is drawn along a moving trace of the stylus pen, to be displayed.

Thereafter, if the touch input with the two fingers is released, the controller 180 runs all applications corresponding to icons selected by the two fingers, respectively and is then able to control texts 1920 and 1930 corresponding to the writing object 1910 to be applied to the run applications. For instance, if the icon selected by the index finger is the icon of a note application and the icon selected by the thumb is the icon of a message application, like the example shown in FIG. 19(*b*), the controller 180 runs a note application and a message application in a first region and a second region of the display unit 151, respectively and is also able to control the texts 1920 and 1930 corresponding to the writing object 1910 to be applied to the note application and the message application, respectively.

According to the embodiments mentioned in the foregoing description, if an attribute of a text corresponding to a writing object is to interwork with a specific application, the controller 180 may control a hyperlink to the specific application to be set at the text.

FIGS. 20A to 20D are diagrams for one example of setting up a hyperlink to a specific application at a text according to the present invention.

Figure 20A:
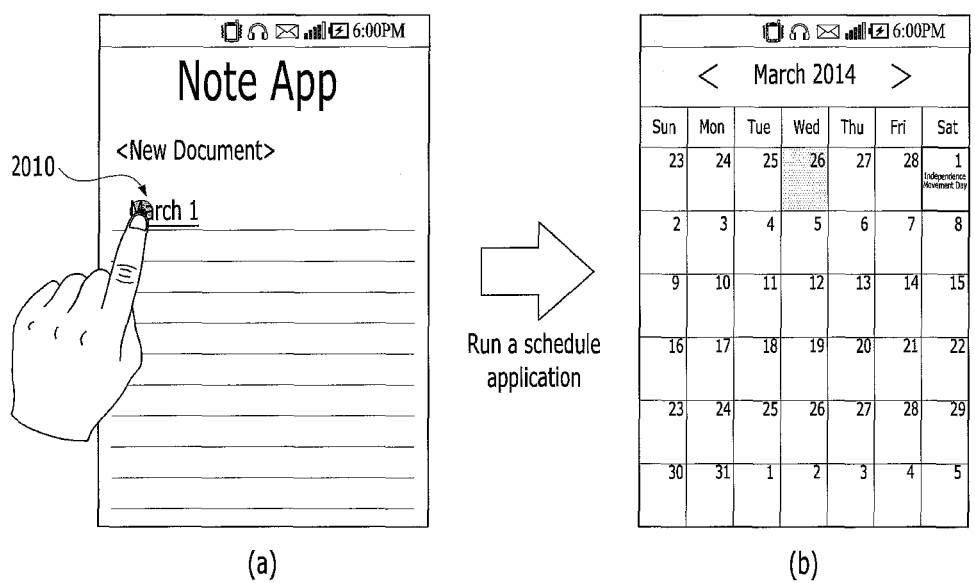

Referring to FIG. 20A(a), if a text 2010 corresponding to a writing object indicates a specific date (e.g., March 1, etc.) or a specific time (e.g., 4 PM Sunday, etc.), the controller 180 can control a hyperlink to a schedule application (or an alarm application) to be set up at the corresponding text. If the hyperlinked text is touched, referring to FIG. 20A(b), the controller 180 can control the schedule application (or the alarm application) to be run.

Referring to FIG. 20B(a), if a text 2020 corresponding to a writing object indicates a specific place such as 'Seoul', 'Gtyungbok-Gung' or the like, the controller 180 can control a hyperlink to a map application to be set up at the corresponding text. If the hyperlinked text is touched, referring to FIG. 20B(b), the controller 180 can control the map application to be run.

Figure 20C:
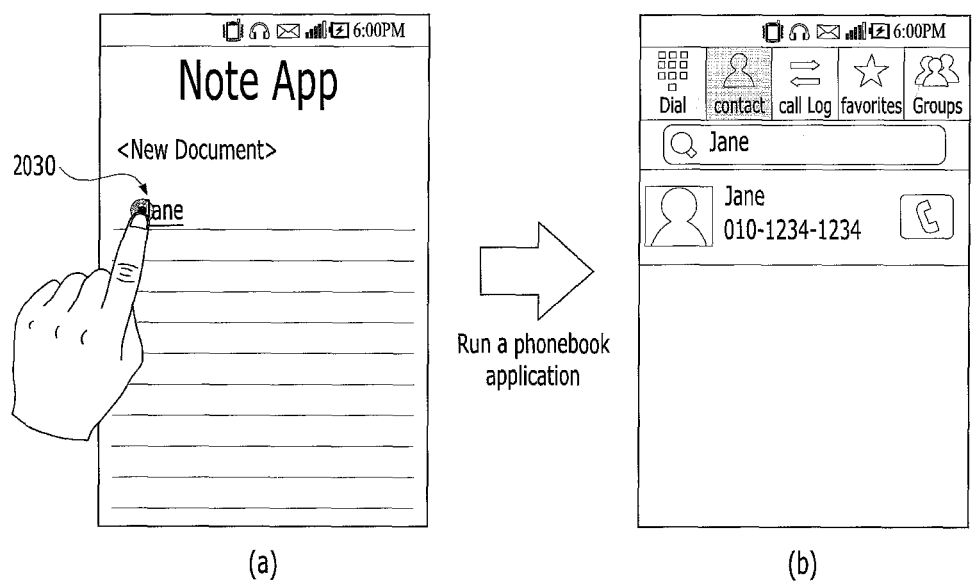

Referring to FIG. 20C(a), if a text 2030 corresponding to a writing object indicates a person registered at a phonebook, the controller 180 can control a hyperlink to a phonebook application (or a call application) to be set up at the corresponding text. If the hyperlinked text is touched, referring to FIG. 20C(b), the controller 180 can control the phonebook application (or the call application) to be run.

Figure 20D:
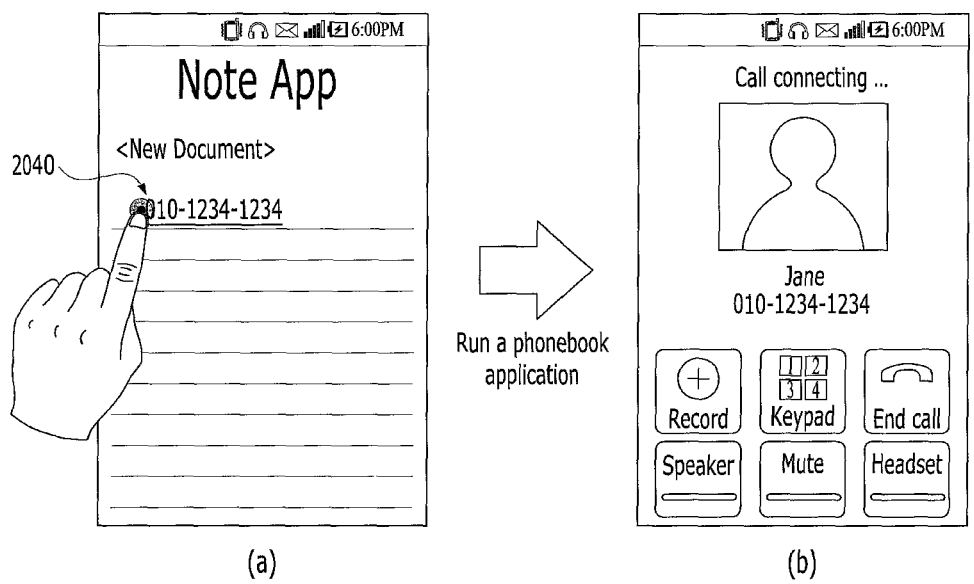

Referring to FIG. 20D(a), if a text 2040 corresponding to a writing object indicates a numeral of a phone number type, the controller 180 can control a hyperlink to a call application to be set up at the corresponding text. If the hyperlinked text is touched, referring to FIG. 20D(b), the controller 180 runs the call application and is also able to make a phone call to the selected phone number.

Like the examples shown in FIGS. 20A to 20D, in accordance with an attribute of a text, the controller 180 can control an application capable of interworking with the text to be set up at the text. Moreover, in case that there are a plurality of applicable capable of interworking with the text, when a text is touched, a menu for selecting the application to interwork with may be displayed [not shown in the drawings].

Like the examples shown in FIGS. 8 to 20, in case of inserting a text corresponding to a writing object or a copy object corresponding to a copy of the writing object, the writing object can be deleted by an additional gesture of the auxiliary pointer described with reference to FIG. 5 or FIG. 6 or a color of the writing object can be changed by an additional gesture of the auxiliary pointer described with reference to FIG. 5 or FIG. 6. In particular, if the color of the writing object is changed, a color of the text corresponding to the writing object or a color of the copy object corresponding to the copy of the writing object may be changed. Yet, although the writing object is deleted, the text corresponding to the writing object or the copy object corresponding to the copy of the writing object may be maintained without being deleted.

While another preset touch input is maintained, if a text or a copy object is inputted, like the example shown in FIG. 7, the controller 180 can control a writing object to disappear after the elapse of a prescribed time. In doing so, the controller 180 may control the text or the copy object to disappear together with the writing object or may control the writing object to disappear only by maintaining the text or the copy object.

According to the aforementioned embodiments, while a touch input with an auxiliary pointer is maintained, if a touch input with a main pointer is received, a writing object drawn along a moving trace of the main pointer is displayed for example.

According to one embodiment of the present invention, in accordance with a state of a main pointer touching the display unit in the course of maintaining a touch input with an auxiliary pointer, the controller 180 can determine whether to display a writing object or to run a different function.

For instance, first of all, the controller 180 distinguishes a state of pushing a button included in a stylus pen from a state of not pushing the button included in the stylus pen. If the display unit 151 is touched with the stylus pen in the state of not pushing the button included in the stylus pen (or, in the state of pushing the button included in the stylus pen), the controller 180 controls a writing object, which is drawn along a trace of the stylus pen, to be displayed. On the other hand, If the display unit 151 is touched with the stylus pen in the state of pushing the button included in the stylus pen (or, in the state of not pushing the button included in the stylus pen), the controller 180 controls a menu (or a tool box) for a writing input) to be displayed or can set a copy region or a cut region to a region designated by the stylus pen to execute a command such as a copying, a cutting, an application list displaying, an application executing or the like. In particular, the controller 180 can determine whether to input a writing or to run a specific function depending on whether the button of the stylus pen touching the display unit 151 is pushed.

Unlike the above description, by distinguishing a case of touching the display unit 151 with one of both ends of a stylus pen from a case of touching the display unit 151 with the other, it may be able to determine whether to display a writing object drawing along a trace of the stylus pen or to run a different function. In particular, the controller 180 can determine whether to input a writing or to run a specific function depending on a fact that the display unit 151 is touched with which one of the two ends of the stylus pen.

In the embodiments mentioned in the following description, if a writing is inputted in response to a touch with a stylus pen, it is defined that the stylus pen is in 'writing mode'. If a specific function is run in response to a touch with a stylus pen, it is defined that the stylus pen is in 'function mode'.

Embodiments for running a specific function in response to a touch input with a main pointer are described in detail with reference to the accompanying drawings.

FIG. 21 is a diagram for one example of displaying a tool box used in inputting a writing by a touch with a main pointer according to the present invention.

Referring to FIG. 21, while a touch input with an auxiliary pointer, if the display unit 151 is touched with a stylus pen in function mode [FIG. 21(*a*)], the controller 180 can control a menu (or a tool box), which is used to input a writing, to be displayed [FIG. 21A(b)].

For example, in the tool box 2110 shown in FIG. 21, a selection tool for selecting a writing object, a straight line drawing tool for drawing a straight line, a curve dragging tool for drawing a curve, an arrow drawing tool for drawing an arrow, a table composing toll for composing a table, and the like are included.

The individual drawing tools are described in detail with reference to FIGS. 22A to 22F as follows.

FIGS. 22A to 22F are diagrams to describe a drawing tool.

Figure 22A:
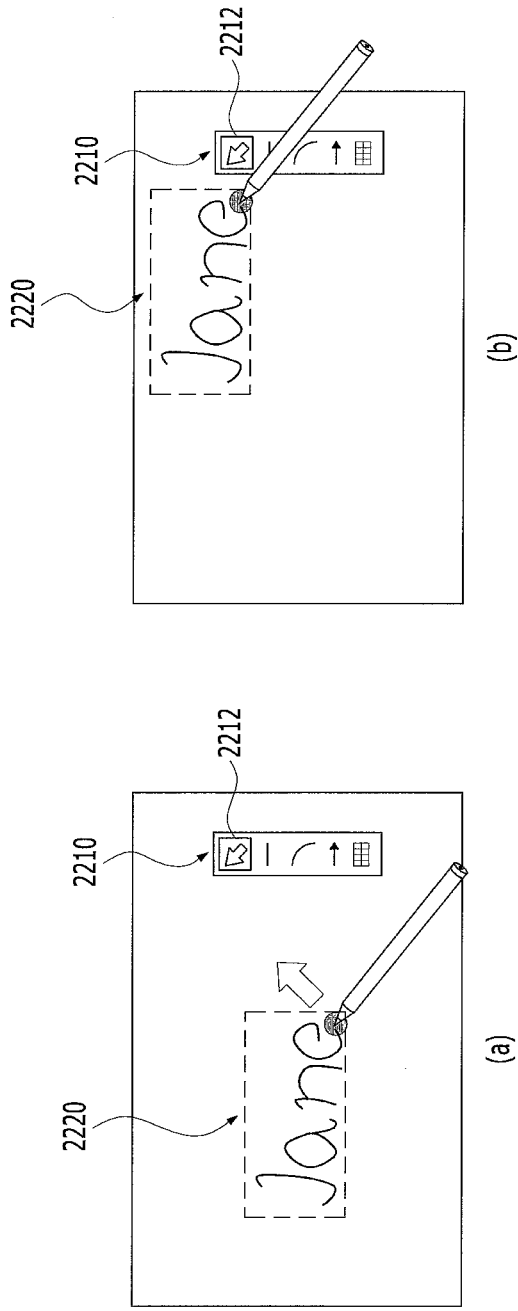

Referring to FIG. 22A(a), while a selection tool 2212 is selected, if a touch input of touching a currently displayed writing object 2220 is received, the controller 180 can select the touched writing object 2220. While the writing object 2220 is selected, if a drag input (or a drag & drop input) is received, referring to FIG. 2A(b), the controller 180 can move a location of the writing object 2220 or change a size of the writing object 2220, based on the drag input (or the drag & drop input).

Referring to FIG. 22B, while a straight line drawing tool 2214 is selected [FIG. 22B(a)], if a touch input of selecting a first point and a second point on the display unit 151 is received, the controller 180 can control a straight line 2230, which connects the first point and the second point to each other, to be displayed [FIG. 22B(b)].

Figure 22C:
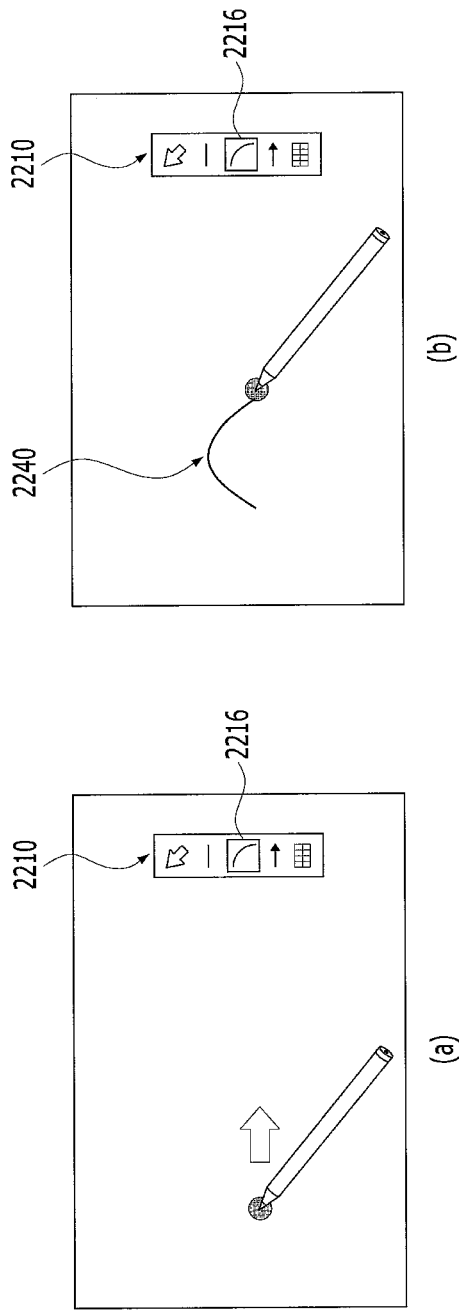

Referring to FIG. 22C, while a curve drawing tool 2216 is selected [FIG. 22C(a)], if a touch input of selecting a first point and a second point on the display unit 151 is received, the controller 180 can control a curve 2240, which connects the first point and the second point to each other, to be displayed [FIG. 22C(b)].

Referring to FIG. 22D, while an arrow drawing tool 2218 is selected [FIG. 22D(a)], if a touch input of selecting a first point and a second point on the display unit 151 is received, the controller 180 can control an arrow 2250, which connects the first point and the second point to each other, to be displayed [FIG. 22D(b)].

According to the examples shown in FIGS. 22B to 22D, a touch input of selecting a first point and a second point may mean an input of touching each of the first point and the second point with a pointer (e.g., a main pointer, an auxiliary pointer, etc.) or a drag input (or a drag & drop input) of connecting the first point and the second point to each other through a pointer (e.g., a main pointer, an auxiliary pointer, etc.).

Referring to FIG. 22E, while a table composing tool 2219 is selected, if a user input of touching the display unit 151 is received, the controller 180 can control a table to be displayed on the display unit 151 [FIG. 22E(a)]. In doing so, like the example shown in FIG. 22E(b), the controller 180 displays a setting menu 2260 for setting the number of rows and the number of columns of the table. Subsequently, the controller 180 can determine the number of rows and the number of columns of the table based on the setting values of the setting menu 2260 or may determine the number of rows and the number of columns of the table based on preset values.

If a touch input (e.g., a drag input, a flicking input, etc.) of traversing the table in a width direction is received through a pointer (e.g., a main pointer, an auxiliary pointer, etc.), the controller 180 can control the number of the rows of the table to be incremented by 1. In addition, if a touch input (e.g., a drag input, a flicking input, etc.) of traversing the table in a length direction is received through a pointer (e.g., a main pointer, an auxiliary pointer, etc.), the controller 180 can control the number of the columns of the table to be incremented by 1. For instance, if a touch input of traversing a table 2270 having 1×1 configuration (i.e., 1 row & 1 column) is received [FIG. 22E(c)], the controller 180 can control the configuration of the table to be changed into 2×1 (i.e., 2 rows & 1 column) by incrementing the number of rows of the table 2270 by 1. Moreover, if a touch input of traversing a table having 2×1 configuration is received, the controller 180 can control the configuration of the table to be changed into 2×2 by incrementing the number of columns of the table by 1 [not shown in the drawing].

By distinguishing a touch input with a main pointer from a touch input with an auxiliary pointer, the controller 180 may recognize one of the two touch inputs as an input for selecting a prescribed cell configuring a table and may recognize the other as a writing for composing a content to be inputted to a selected cell.

Figure 22F:
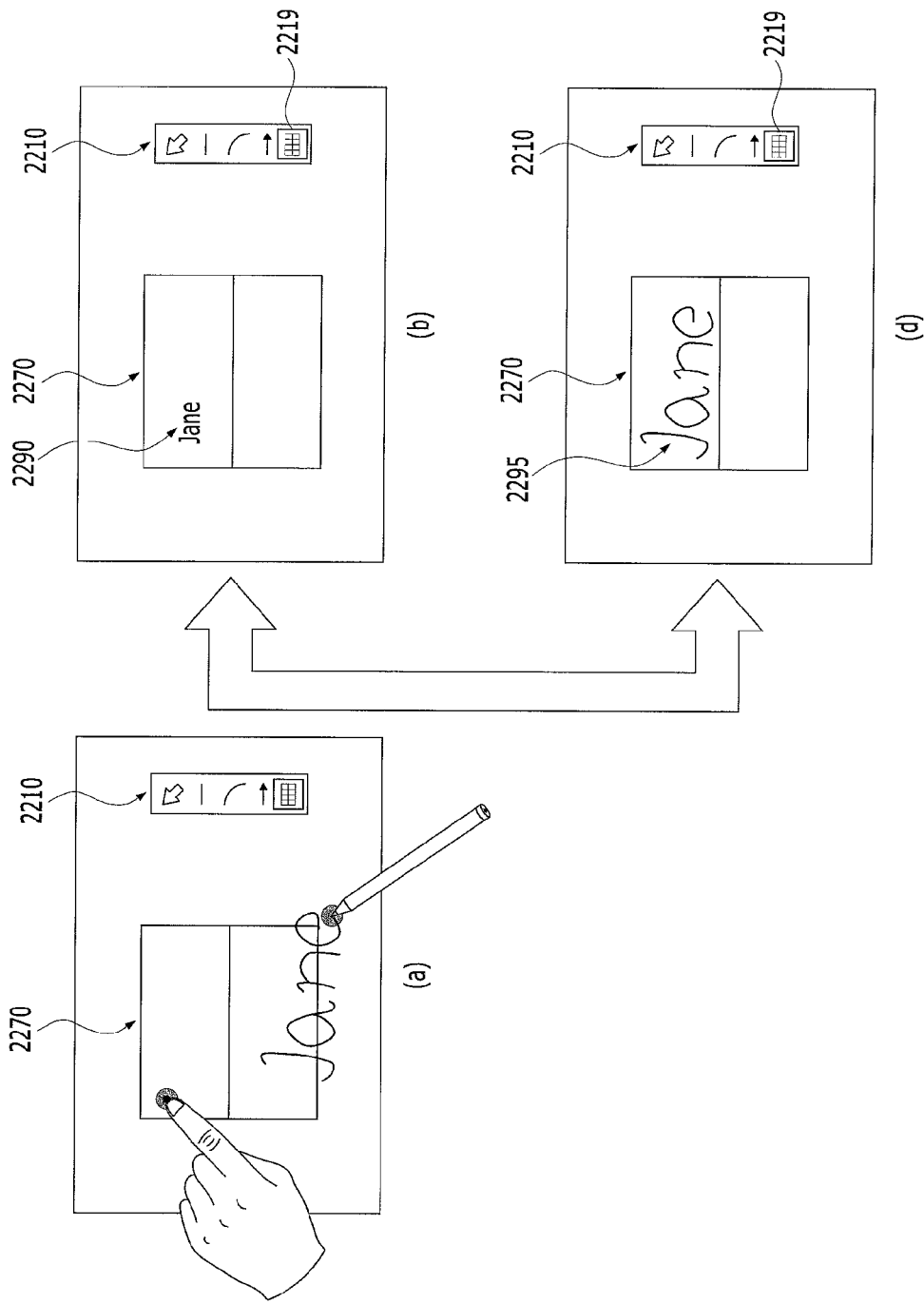

For instance, FIG. 22F is a diagram for one example of inputting an appropriate content to a selected cell in response to a touch input with a main pointer and a touch input with an auxiliary pointer. For clarity of the following description, assume that a touch input with a finger (i.e., an auxiliary pointer) is an input for selecting a cell. And, assume that a touch input with a stylus pen (i.e., a main pointer) is an input for composing a content to be inputted to the selected cell.

Referring to FIG. 22F, if a prescribed one of cells configuring a table 2270 is touched with a finger and the display unit 151 is touched with a stylus pen in writing mode in the course of maintaining the touch to the selected cell [FIG. 22F(a)], the controller 180 controls a writing object 2280, which is drawn along a trace of the stylus pen, to be displayed and is also able to control a text 2290 corresponding to the writing object 2280 or a writing object 2295, of which size is adjusted to fit a size of the selected cell, to be inputted to the selected cell [FIG. 22F(b), FIG. 22F(c)].

According to the examples shown in FIGS. 22A to 22F, after a prescribed tool has been selected from a tool box, if a touch input with a pointer (e.g., a main pointer, an auxiliary pointer, etc.) is applied, a function of selecting a writing object, a function of creating a writing object such as a curve, a straight line or the like, a function of creating a table, or the like can be run. Unlike the examples shown in the drawings, only if a touch input with an auxiliary pointer is currently maintained, the controller 180 may control a tool configuring a tool box to be selected by a main pointer. Only if a touch input with an auxiliary pointer is currently maintained, the controller 180 may run a function of selecting a writing object, a function of creating a writing object such as a curve, a straight line or the like, a function of creating a table, or the like based on a touch input with a main pointer.

The tool box shown in FIGS. 22A to 22F is just provided to describe one example of menu items applicable to the present invention, by which the present invention is non-limited. The tool box may include all or some of the drawing tools shown in FIGS. 22A to 22F. Moreover, the tool box may further include other drawing tools (e.g., an erasing tool for erasing an inputted writing object, etc.) failing to be shown in the drawings.

Figure 23:
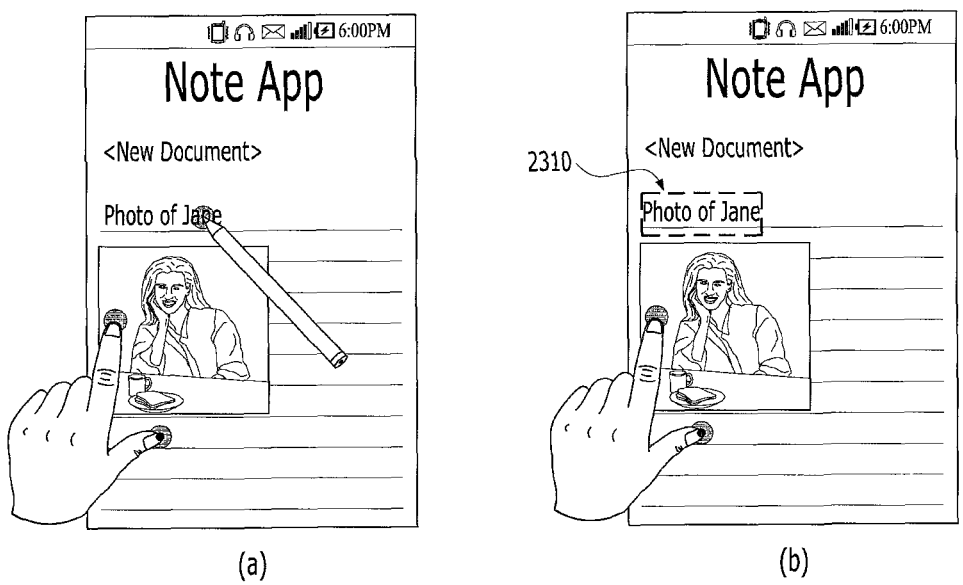
FIG. 23 is a diagram for one example of setting a copy region (or a cut region) by a touch with a main pointer according to the present invention.

FIG. 23 is a diagram for one example of setting a copy region (or a cut region) by a touch with a main pointer according to the present invention.

Referring to FIG. 23, while a touch input with an auxiliary pointer is maintained, if the display unit 151 is touched with a stylus pen in function mode [FIG. 23 (*a*)], the controller 180 can control a region designated by the stylus pen to be set as a copy region 2310 [FIG. 23(*b*)].

Once the copy region 2310 is set, the controller 180 can control the set region to be visually identified. According to the example shown in FIG. 23(*b*), as a dotted-line outline is set for a boundary of the copy region 2310, the copy region 2310 is visually identifiable.

According to embodiments for setting a copy region or a cut region (i.e., a region to be cut), the controller 180 can set a copy or cut region to an inside of a closed curve indicated by a touch trace of a stylus pen, a rectangle having two points indicated by a stylus pen as a diagonal, or the like.

Figure 24B:
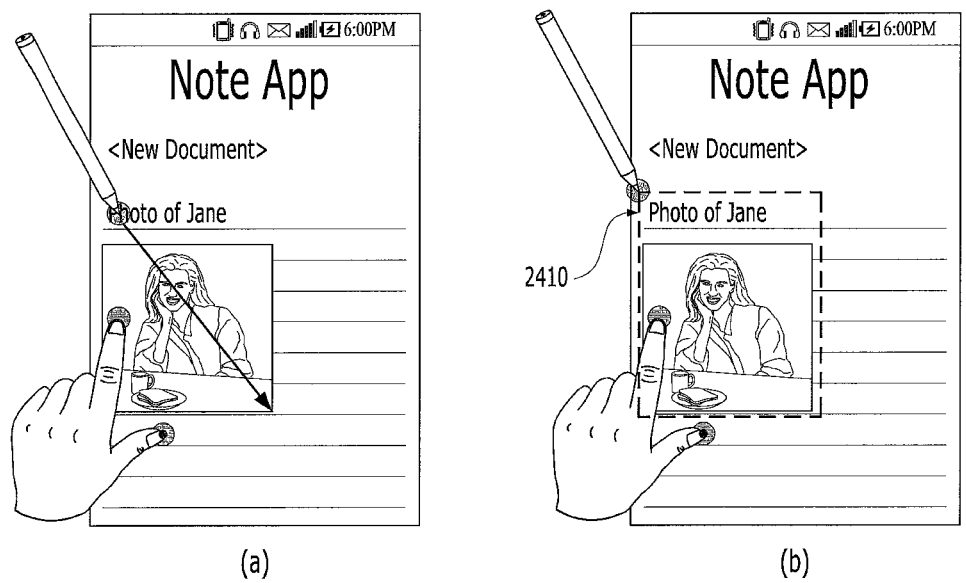

For instance, FIG. 24A and FIG. 24B are diagrams for one example of setting a copy region according to the present invention.

Referring to FIG. 24A(a), if a trace of a stylus pen forms a closed curve [FIG. 24A(a)], the controller 180 can control an inside of the closed curve to be set as a copy region 2410 [FIG. 24A(b)].

Referring to FIG. 24B(a), if a trace of a stylus pen forms a line [FIG. 24B a)], the controller 180 can control a copy region 2410 to be set to a rectangle of which diagonal is a straight line connecting both end points on a moving trace of the stylus pen [FIG. 24B(b)].

After a copy region or a cut region has been set, if a command for pasting on a prescribed location is inputted, the controller 180 copies/cuts information included in the copy/cut region and is then able to paste the copied/cut information on the prescribed location.

Figure 25:
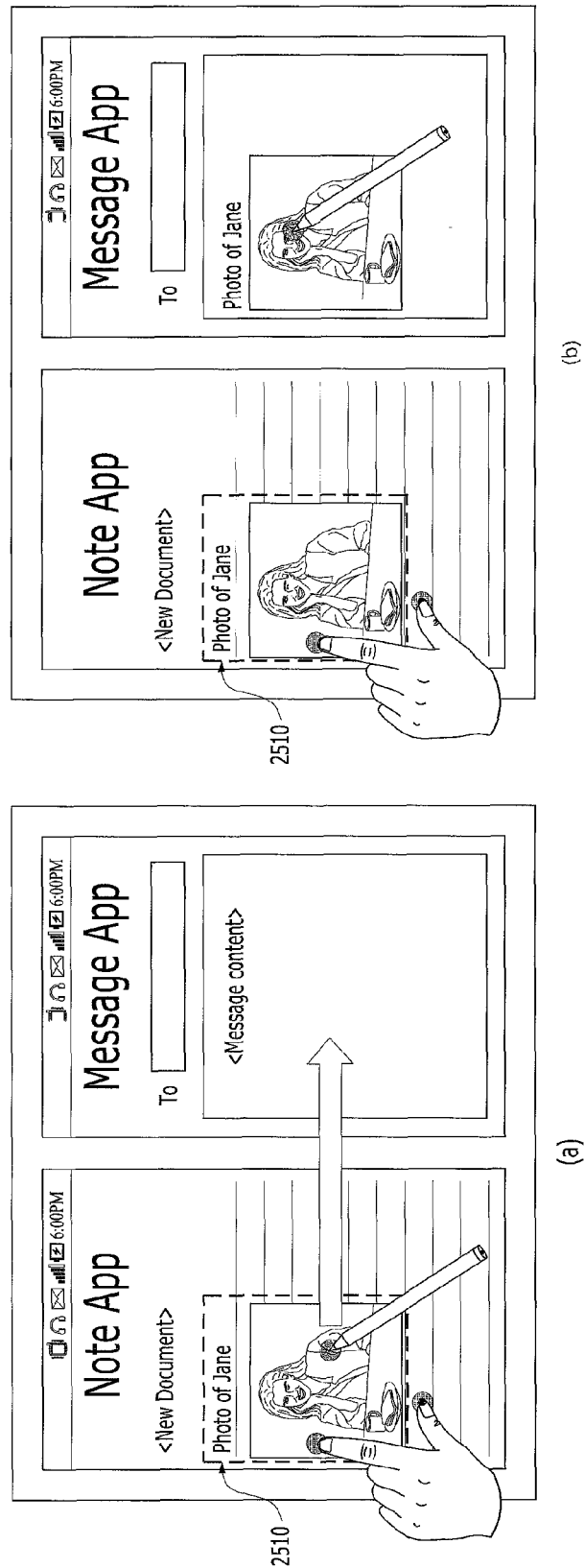
FIG. 25 is a diagram for one example of pasting information included in a copy or cut region on a prescribed location according to the present invention.

For instance, FIG. 25 is a diagram for one example of pasting information included in a copy or cut region on a prescribed location according to the present invention.

Referring to FIG. 25, as the display unit 151 is partitioned into a first region and a second region, different informations are currently displayed on the first region and the second region, respectively. In doing so, like the example shown in FIG. 25(*a*), while a touch input with an auxiliary pointer is maintained, a copy region (or, a cut region) 2510 may be set in the first region by a stylus pen.

Thereafter, if a user input of intending to paste the set copy (or cut) region 2510 on the second region of the display unit 151 from the first region is received, referring to FIG. 25(*b*), the controller 180 can paste the information previously displayed through the copy (or cut) region 2510 on the second region. In case of pasting the information of the copy region on a location indicated by a user input, the information displayed on the copy region can be maintained intact. Yet, in case of pasting the information of the cut region on a location indicated by a user input, the information previously displayed on the cut region can be deleted.

The controller 180 can paste a capture image, which is created from capturing the copy (or cut) region in the first region, on the second region. For another example, the controller 180 may be able to paste an object (e.g., a text, an image, etc.) included in the copy (or cut) region in the first region on the second region.

In this case, the user input of intending to paste the set copy (or cut) region on the second region from the first region on the display unit 151 may include a drag & drop of dragging a stylus pen in function mode to the second region from the copy (or cut) region or a touch input of touching the second region with the stylus pen in the function mode. In doing so, the controller 180 may be able to paste the information of the copy (or cut) region on a stylus pen released location in the second region.

If a copy region (or a cut region) is set on a webpage, the controller 180 can control a URL (uniform resource locator) address of the webpage to be set as a hyperlink of a copied information (or a cut information) or may control the URL address to be copied together with the corresponding information.

Figure 26:
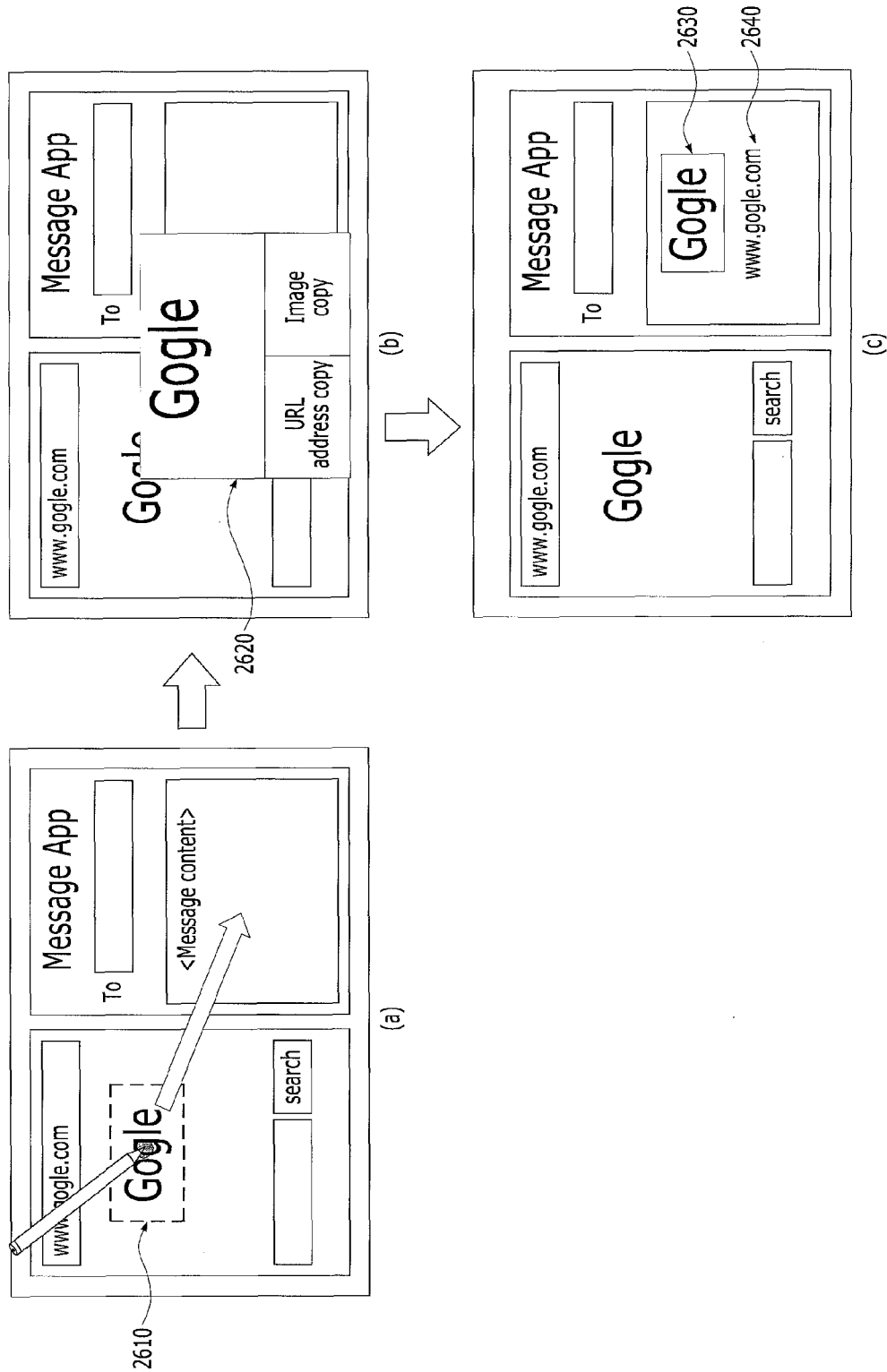
FIG. 26 is a diagram to describe one example of copying a URL address of a webpage together with information in a copy region according to the present invention.

For instance, FIG. 26 is a diagram to describe one example of copying a URL address of a webpage together with information in a copy region according to the present invention. For clarity of the following description, assume that a webpage is currently outputted through a first region of the display unit 151.

Referring to FIG. 26(*a*), after a partial region of a webpage displayed through a first region has been set as a copy region 2610, if a user input (e.g., a drag & drop input, etc.) of intending to paste the set copy region 2610 on a second region is received, the controller can paste the information previously displayed through the copy region 2610 on the second region [2630]. In doing so, the controller 180 sets a URL address 2640 of the webpage previously displayed through the first region as a hyperlink of the information copied to the second region, or may paste the URL address 2640 of the webpage on the second region together with the information 2630 displayed through the copy region 2610 [FIG. 26(*c*)].

In doing so, like the example shown in FIG. 26(*b*), the controller 180 can control a menu 2620, which is provided to determine whether to paste the URL address 2640 of the webpage on the second region together with the information previously displayed through the copy region 2610, to be displayed. For example, if an item 'URL address copy' is selected from the menu 2620 shown in FIG. 26(*b*), referring to FIG. 26(*c*), the controller 180 may be able to paste the URL address 2640 of the webpage on the second region together with the information previously displayed through the copy region 2610. On the other hand, if an item 'image copy' is selected from the menu 2620 shown in FIG. 26(*b*), the controller 180 may be able to paste the information previously displayed through the copy region 2610 on the second region only.

For another example, if a writing object is included in a copy region (or a cut region), the controller 180 can control a text, which is read out by applying a text recognition algorithm to the writing object, to be further displayed.

Figure 27:
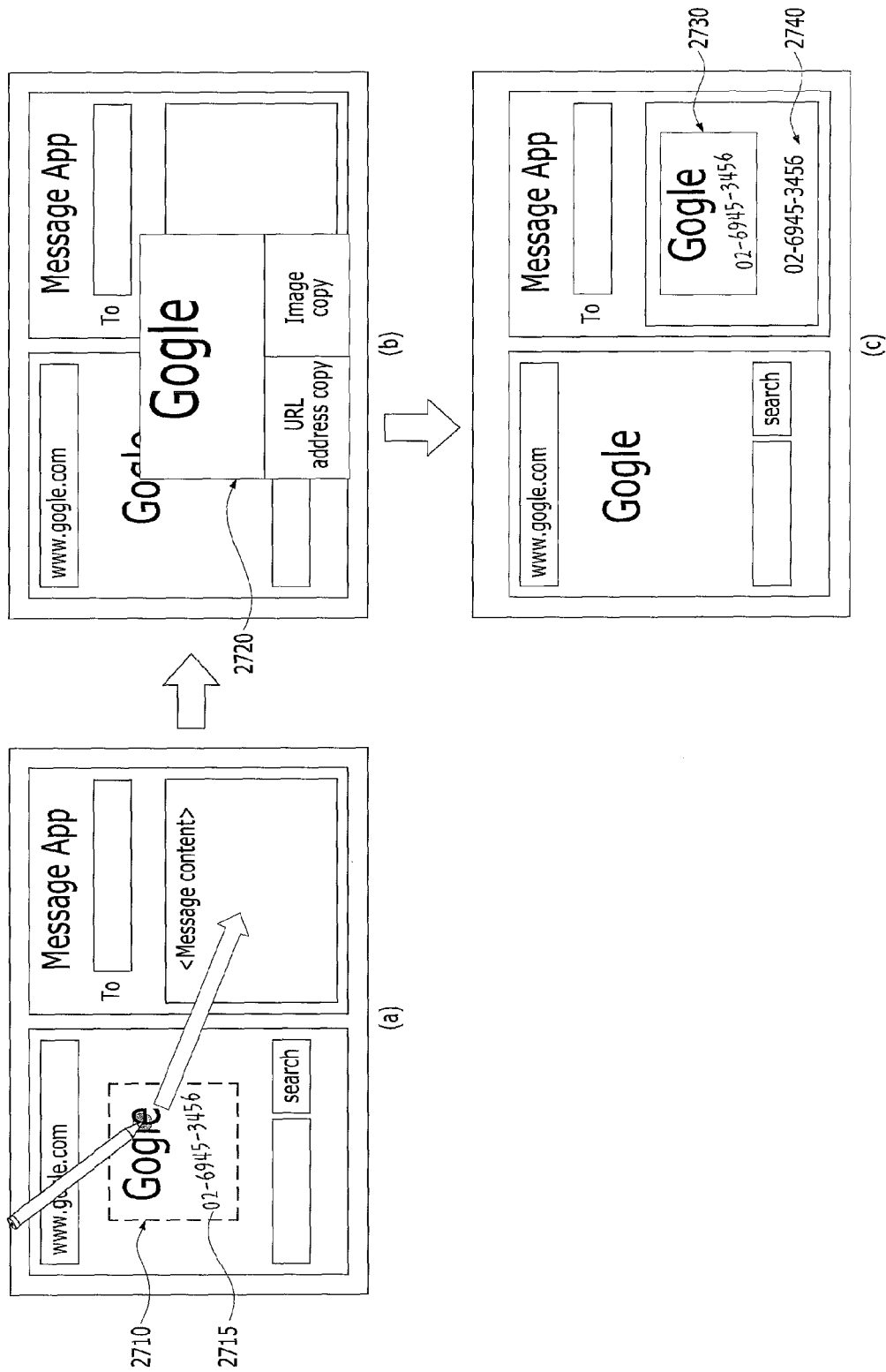
FIG. 27 is a diagram for one example of pasting a text corresponding to a writing object in a copy region together with information in the copy region according to the present invention.

For instance, FIG. 27 is a diagram for one example of pasting a text corresponding to a writing object in a copy region together with information in the copy region according to the present invention.

Referring to FIG. 27(a), after a partial region including a writing object 2715 in a first region has been set as a copy region 2710, if a user input (e.g., a drag & drop input, etc.) of intending to paste the set copy region 2710 on a second region is received, the controller can paste the information previously displayed through the copy region 2710 on the second region [2730]. In doing so, the controller 180 can further paste a text 2740 corresponding to the writing object 2715 included in the copy region 2710 on the second region together with the information 2730 in the copy region 2710 [FIG. 27(c)].

In doing so, like the example shown in FIG. 27(b), the controller 180 can control a menu 2720, which is provided to determine whether to paste the writing object 2715 included in the copy region 2710 on the second region, to be displayed together with the information previously displayed through the copy region 2710. For example, if an item 'writing text copy' is selected from the menu 2720 shown in FIG. 27(b), referring to FIG. 27(c), the controller 180 may be able to paste the text 2740 corresponding to the writing object 2715 on the second region together with the information previously displayed through the copy region 2710. On the other hand, if an item 'image copy' is selected from the menu 2720 shown in FIG. 27(b), the controller 180 may be able to paste the information previously displayed through the copy region 2710 on the second region only.

Depending on a state of a main pointer, the controller 180 runs an application instead of displaying a writing object or may control a runnable application list to be displayed.

Figure 28:
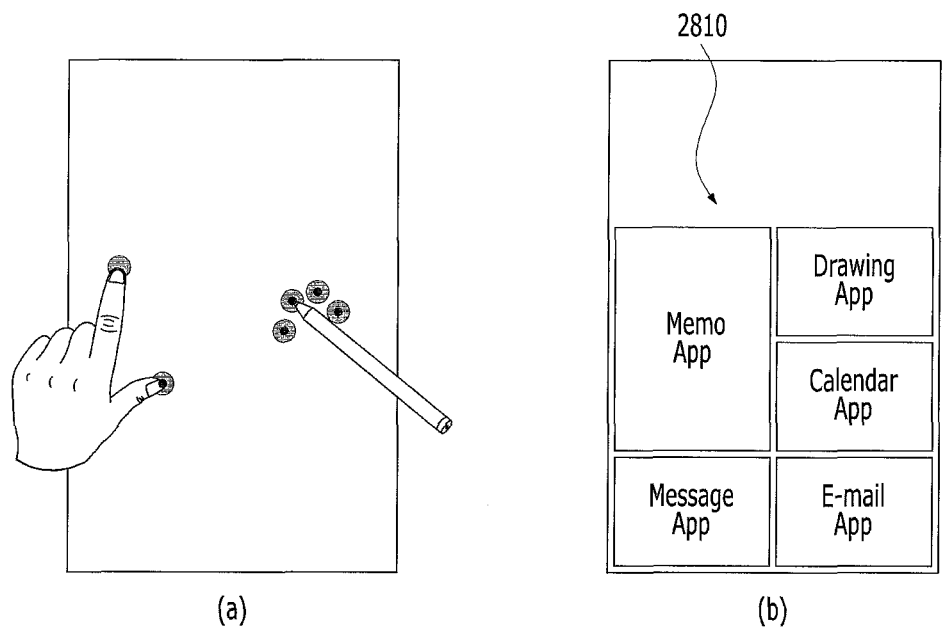
FIG. 28 is a diagram for one example of displaying an application list by a touch with a main pointer according to the present invention.

FIG. 28 is a diagram for one example of displaying an application list by a touch with a main pointer according to the present invention.

Referring to FIG. 28, while the display unit 151 is touched with two fingers, if a user input of paging a runnable application list with a stylus pen in function mode is received [FIG. 28(a)], the controller 180 can control the runnable application list 2810 to be displayed through the display unit 151 [FIG. 28(b)]. If at least one application is selected from the runnable application list, the controller 180 may run the selected at least one application.

In this case, the user input of the runnable application list may include an input of tapping the display unit 151 with a stylus pen in function mode in accordance with a preset count or a preset pattern, by which the user input is non-limited.

Moreover, the runnable application list may include an application list recently run in the mobile terminal 100, an application list recently run by a touch input with a stylus pen in the mobile terminal 100, or the like, by which the runnable application list is non-limited.

According to the example shown in FIG. 28, an application can be run by running at least one application selected from the runnable application list. Unlike the example shown in FIG. 28, a prescribed application may be directly run by a touch input with a stylus pen. The controller 180 can run an application most recently run in the mobile terminal 100 by a touch input with a stylus pen or an application most recently run by a stylus pen in the mobile terminal 100, and the like.

After a copy region or a cut region has been set, if a random application is selected from an application list, the controller 180 runs the selected application and is also able to control information included in the copy or cut region to be automatically inserted in the run application.

Figure 29:
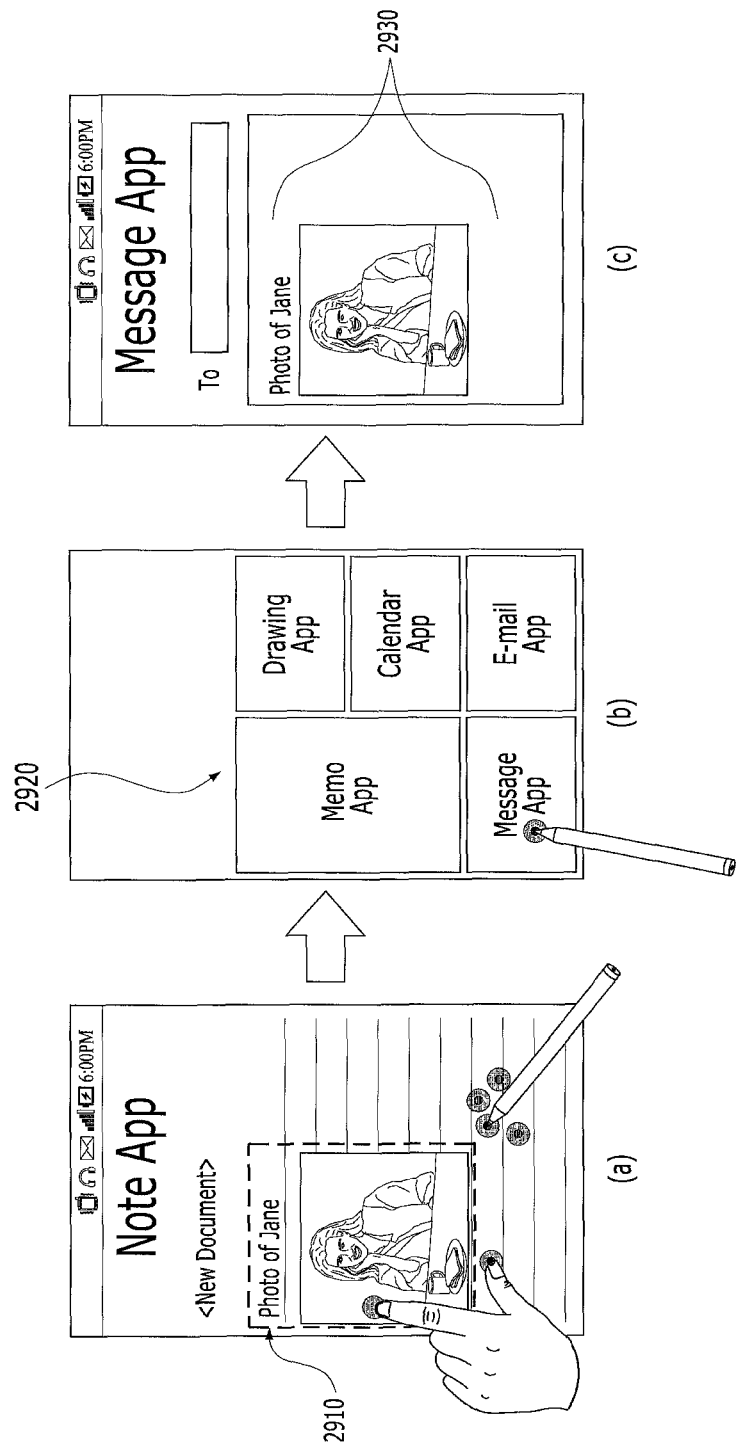
FIG. 29 is a diagram for one example of automatically inserting information included in a copy region (or a cut region) into a run application according to the present invention.

FIG. 29 is a diagram for one example of automatically inserting information included in a copy region (or a cut region) into a run application according to the present invention.

Referring to FIG. 29, the controller 180 can set a copy region (or a cut region) 2910 through a touch input with a stylus pen in function mode [FIG. 29(a)]. Thereafter, while the display unit 151 is touched with two fingers, if a user input of paging a runnable application with a stylus pen in function mode is received, referring to FIG. 29(b), the controller 180 can control the runnable application list 2920 to be displayed.

If at least one application is selected from the application list, the controller 180 runs the selected application and is also able to control information included in the copy or cut region to be automatically inserted in the run application [2930]. For example, if a message application is run, referring to FIG. 29(c), the controller 180 can control a message composing screen, in which the information included in the copy (or cut) region is inserted as a text content [2930], to be displayed.

If a touch input of combining a plurality of icons into one with a stylus pen in function mode is received, the controller 180 creates a folder and is able to control a plurality of the icons combined by the stylus pen to move to the created folder.

Figure 30:
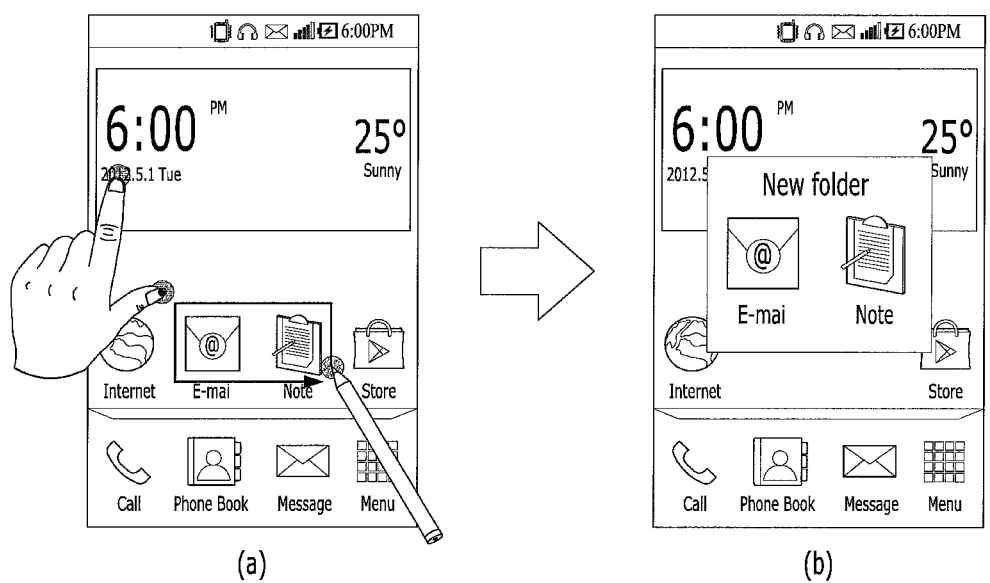
FIG. 30 is a diagram to describe one example of moving a plurality of icons into a single folder according to the present invention.

For instance, FIG. 30 is a diagram to describe one example of moving a plurality of icons into a single folder according to the present invention.

Referring to FIG. 30, while a touch with a finger is maintained, if a stylus pen in function mode moves along a trace of combining a plurality of icons into one [FIG. 30(a)], when the stylus pen in the function mode or the finger is released from the touch, the controller 180 can control a plurality of the icons combined into one by the stylus pen to move to a single folder 3010 [FIG. 30(b)].

According to the aforementioned embodiments, while a touch with an auxiliary pointer is maintained, if a touch with a main pointer is detected, a writing is inputted along a touch trace of the main pointer. In particular, according to the aforementioned embodiments, while a touch with an auxiliary pointer is maintained, the mobile terminal 100 may maintain a state of receiving an input of a writing with a stylus pen.

Unlike the embodiments mentioned in the foregoing description, by a manipulation of a button provided to the mobile terminal 100 or a touch to a displayed icon, the controller 180 may control the mobile terminal 100 to enter a state of receiving an input of a writing.

Figure 31:
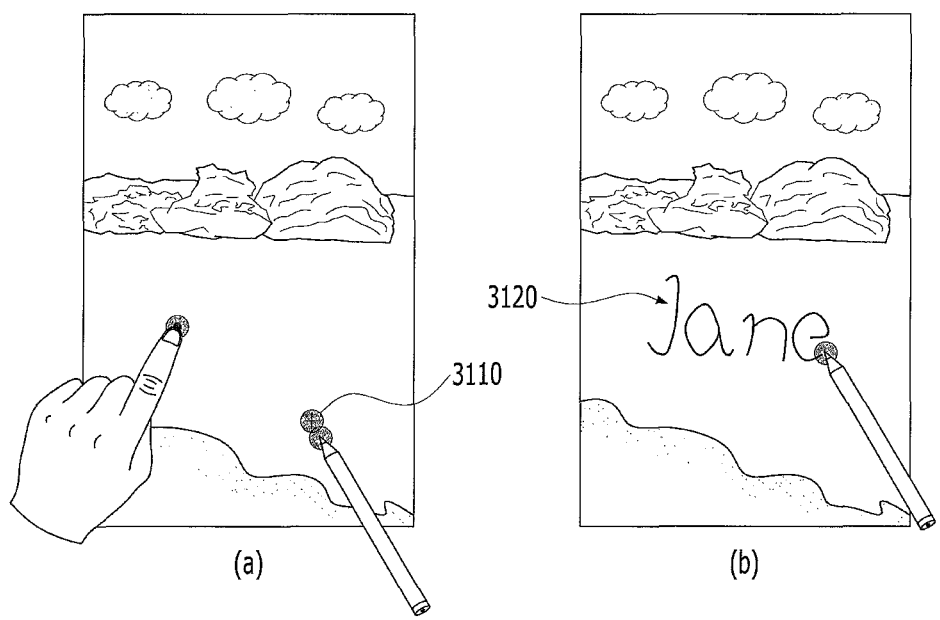
FIG. 31 is a diagram for one example of switching a state of a mobile terminal to a state capable of receiving a writing input by touching an icon according to the present invention.

For instance, FIG. 31 is a diagram for one example of switching a state of a mobile terminal to a state capable of receiving a writing input by touching an icon according to the present invention.

Referring to FIG. 31(a), while the display unit 151 is touched with an auxiliary pointer, if a main pointer approaches the display unit 151, the controller 180 can control an icon 3110, which is provided to switch a state of the mobile terminal 100 to a writing inputtable state, to be displayed. If the displayed icon 3110 is touched, the controller 180 can control the mobile terminal 100 to enter the writing inputtable state.

Once the mobile terminal 100 enters the writing inputtable state, referring to FIG. 31(*b*), the controller 180 can control a writing 3120 to be inputted along a touch trace of a stylus pen irrespective of whether the auxiliary pointer currently touches the display unit 151.

FIG. 31 is provided to describe one example of switching a state of the mobile terminal to a writing inputtable state only. And, it is a matter of course that the mobile terminal 100 can enter a writing inputtable state by a method different that of the example shown in FIG. 31. For instance, if a physical button provided to the mobile terminal 100 is pushed, the mobile terminal 100 can enter a writing inputtable state. As a specific application installed on the mobile terminal 100 is run, the mobile terminal 100 can enter a writing inputtable state.

While the mobile terminal 100 maintains the writing inputtable state, as mentioned in the foregoing description with reference to FIGS. 21 to 29, an operation of the mobile terminal 100 can be differentiated depending on a state of a stylus pen.

If a writing object is inputted by a main pointer, the controller 180 can control an application list for sharing the writing object to be displayed.

Figure 32:
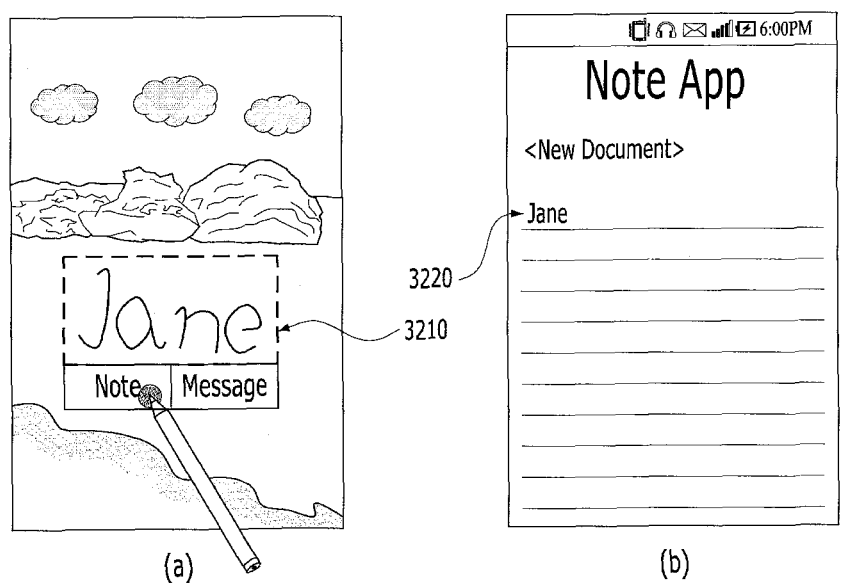
FIG. 32 is a diagram for one example of displaying an application list for sharing a writing object according to the present invention.

For instance, FIG. 32 is a diagram for one example of displaying an application list for sharing a writing object according to the present invention.

Referring to FIG. 32(*a*), if a writing is inputted by a stylus pen, the controller 180 can control an application list for sharing a writing object to be displayed around a writing object 3210. According to the example shown in FIG. 32(*a*), applications for sharing writing objects may include a memo application and a message application.

If at least one application is selected from the application list, the controller 180 runs the selected application and is also able to control a text corresponding to the writing object 3210 or the writing object 3210 to be inserted in the run application.

For example, assuming that a note application is selected from the application list shown in FIG. 32(*a*), referring to FIG. 32(*b*), the controller 180 runs the note application and is also able to control the writing object 3210 to be applied to the run note application. In particular, the controller 180 can control a text 3220 corresponding to the writing object 3210 to be inserted in the note application. The controller 180 may control a copy object corresponding to a copy of the writing object 3210 to be inserted in the note application.

According to the example shown in FIG. 32, an application list for sharing a writing object is displayed around the writing object. On the other hand, the controller 180 may determine an application for sharing a writing object by a user's voice.

For example, after a writing object has been inputted, if a voice 'memo' is inputted from a user, the controller 180 can control the writing object to be inserted in a memo application.

The controller 180 may temporarily hide a writing object displayed through the display unit 151.

Figure 33:
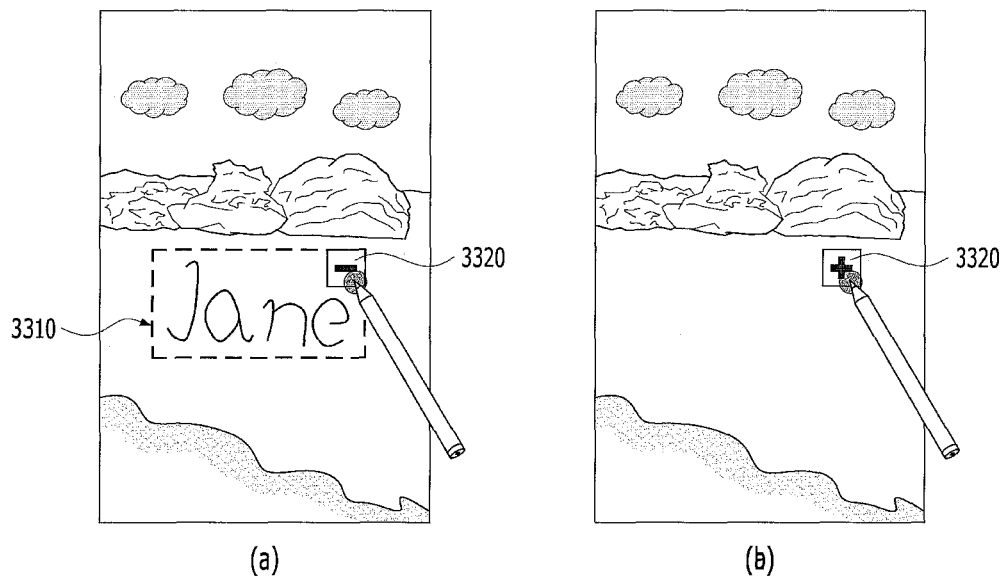
FIG. 33 is a diagram for one example of hiding a writing object according to the present invention.

For instance, FIG. 33 is a diagram for one example of hiding a writing object according to the present invention.

Referring to FIG. 33(*a*), if a writing object 3310 is inputted, the controller 180 can control a button 3320, which is provided to set up whether to hide the writing object 3310, to be displayed around the writing object 3310. If the button 3320 shown in FIG. 33(*a*) is touched, referring to FIG. 33(*b*), the controller 180 can stop displaying the writing object 3310 on the display unit 151. While the writing object 3310 stops being displayed, if the button 3320 is retouched, the controller 180 may resume the display of the writing object 3310.

While a touch input with an auxiliary pointer is maintained, if a proximity touch with a main pointer is applied, the controller 180 can control a field, which is selected by the proximity touch, to be displayed by being enlarged. Thereafter, if the enlarged field is touched with a stylus pen, a writing is inputted along a touch trace of the stylus pen. If the stylus pen is released from the display unit 151, the controller 180 can control a writing object to be inserted in the selected field by reducing the enlarged field into an original size.

For instance, FIG. 34 is a diagram for one example of enlarging a field selected by a proximity touch with a main pointer and then inserting a writing object into the enlarged field according to the present invention.

Referring to FIG. 34, while the display unit 151 is touched with two fingers, if a stylus pen approaches the display unit 151 [FIG. 34(*a*)], the controller 180 can control a field, which is selected by the proximity touch with the stylus pen, to be displayed by being enlarged [FIG. 34(*b*)]. According to the example shown in FIG. 34(*a*) and FIG. 34(*b*), as a proximity touch with a stylus pen is applied over '5' on the calendar, the day '5' is displayed by being enlarged.

Thereafter, after a writing 3410 has been inputted to the enlarged field, if the touch with the stylus pen is released, referring to FIG. 34(*c*), the controller reduces the enlarged field into an original size and is also able to control a writing object 3410 to be inserted in the corresponding field.

Besides, the controller 180 may control a text corresponding to the writing object to be inserted in the corresponding field.

While a calculator application is run, if a formula is inputted by a writing with a stylus pen, the controller 180 can automatically calculate the inputted formula. For example, if a writing inputted with a stylus pen indicates '48×6=', the controller 180 can control an operation result '288' of '48×6' to be displayed.

Accordingly, embodiments of the present invention provide various effects and/or features.

According to at least one of embodiments of the present invention, user's convenience in using a mobile terminal can be enhanced.

In particular, the present invention provides a mobile terminal and controlling method thereof, by which a writing input is facilitated using at least two pointers.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a touchscreen configured to receive a touch input from a stylus pen and to receive a touch input from a finger; and
   a controller configured to control the touchscreen based on at least one touch input from the stylus pen and the finger, wherein the controller is configured to:
      in response to receiving a touch trace input from the stylus pen while the touch input from the finger is maintained at at least one application icon on the touchscreen, control the touchscreen to display a writing object based on the touch trace input from the stylus pen, and
      in response to releasing the touch input of the finger from the application icon, execute an application corresponding to the application icon and to apply the displayed writing object to the executed application.

2. The mobile terminal of claim 1, wherein the controller is configured to control the touchscreen to apply a text corresponding to the writing object to the executed application.

3. The mobile terminal of claim 1, wherein in response to elapse of a prescribed time after displaying the writing object, the controller is configured to control the touchscreen to remove the writing object.

4. The mobile terminal of claim 1, wherein the executed application includes at least one of a note application, a phonebook application, or a web browser.

5. The mobile terminal of claim 1, the controller is configured to:
   in response to receiving the touch trace input from the stylus pen while the touch input from two fingers are maintained at two application icons on the touchscreen, control the touchscreen to display the writing object based on the touch trace input from the stylus pen on the touchscreen, and
   in response to releasing the touch input of the finger from the two application icons, execute an application corresponding to a predetermined one of the two application icons and to apply the displayed writing object to the executed application.

6. The mobile terminal of claim 1, the controller is configured to:
   in response to receiving the touch trace input from the stylus pen while the touch input from two fingers are maintained at two application icons on the touchscreen, control the touchscreen to display the writing object based on the touch trace input from the stylus pen on the touchscreen, and
   in response to releasing the touch input of the finger from the two application icons, concurrently execute two applications corresponding to the two application icons and to concurrently apply the displayed writing object to the executed two applications.

7. The mobile terminal of claim 1, wherein the executed application is a web browser, and wherein the controller is configured to:
   in response to releasing the touch input of the finger from the application icon after receiving the touch trace input, execute the web browser and access a first website via the web browser to search for a text corresponding to the displayed writing object.

8. The mobile terminal of claim 7, wherein the controller is configured to:
   in response to a touch input to the application icon without receiving the touch trace input, execute the web browser and access a second website via the web browser, the second website being different from the first website.

9. A method of a mobile terminal to receive inputs from a stylus pen and a finger, the method comprising:
   receiving a touch input from the finger;
   receiving a touch trace input from the stylus pen while the touch input from the finger is maintained at a touchscreen;
   displaying, on the touchscreen, a writing object based on the touch trace input from the stylus pen; and
   in response to releasing the touch input of the finger from an application icon, executing an application corresponding to the application icon and to apply the displayed writing object to the executed application.

* * * * *